United States Patent
Bai et al.

(10) Patent No.: US 6,811,906 B2
(45) Date of Patent: Nov. 2, 2004

(54) METHOD AND APPARATUS FOR MONITORING EQUIVALENT SERIES RESISTANCE AND FOR SHUNTING A FUEL CELL

(75) Inventors: Lijun Bai, Spokane, WA (US); David R. Lott, Spokane, WA (US); Vanell L. Martin, Spokane, WA (US)

(73) Assignee: Relion, Inc., Spokane, WA (US)

( * ) Notice: Subject to any disclaimer, the term of this patent is extended or adjusted under 35 U.S.C. 154(b) by 9 days.

(21) Appl. No.: 10/431,069

(22) Filed: May 6, 2003

(65) Prior Publication Data

US 2003/0207159 A1 Nov. 6, 2003

Related U.S. Application Data

(62) Division of application No. 10/056,543, filed on Jan. 23, 2002, now Pat. No. 6,620,538.

(51) Int. Cl.[7] .................................................. H01M 8/04
(52) U.S. Cl. .............................. 429/13; 429/22; 429/23
(58) Field of Search .............................. 429/13, 22, 23

(56) References Cited

U.S. PATENT DOCUMENTS

| | | | |
|---|---|---|---|
| 4,590,135 | A | 5/1986 | Warszawski et al. |
| 4,599,282 | A | 7/1986 | Hirota et al. |
| 4,689,280 | A | 8/1987 | Gionfriddo |
| 5,242,764 | A | 9/1993 | Dhar |
| 5,858,569 | A | 1/1999 | Meacher et al. |
| 5,981,098 | A | 11/1999 | Vitale |
| 6,013,386 | A | 1/2000 | Lewin et al. |
| 6,017,648 | A | 1/2000 | Jones |
| 6,030,718 | A | 2/2000 | Fuglevand |
| 6,040,072 | A | 3/2000 | Murphy et al. |
| 6,040,076 | A | 3/2000 | Reeder |
| 6,096,449 | A | 8/2000 | Fuglevand et al. |
| 6,132,895 | A | 10/2000 | Pratt et al. |
| 6,160,683 | A | 12/2000 | Boutaghou |
| 6,171,720 | B1 | 1/2001 | Besmann et al. |
| 6,207,308 | B1 | 3/2001 | Grasso et al. |
| 6,214,487 | B1 | 4/2001 | Kelley et al. |
| 6,218,035 | B1 | 4/2001 | Fuglevand et al. |
| 6,218,039 | B1 | 4/2001 | Mease et al. |
| 6,261,710 | B1 | 7/2001 | Marianowski |
| 6,376,110 | B1 | 4/2002 | Koschany |
| 6,376,111 | B1 | 4/2002 | Mathias et al. |
| 6,468,683 | B1 | 10/2002 | Menzer et al. |
| 6,524,733 | B1 | 2/2003 | Nonobe |

FOREIGN PATENT DOCUMENTS

| WO | WO 01 28022 | 4/2001 |
|---|---|---|
| WO | WO 02 37342 | 4/2002 |

OTHER PUBLICATIONS

Ihonen et al., "A Novel polymer electrolyte fuel cell . . . ", Electrochimica Acta, 46, 2001 (no month), pp. 2899–2911.*
Beattle, Paul D., "Ionic Conductivity of Proton Exchange Membranes", *J. of Electmanulyrical Chemistry*, No. 503, Pp. 45–56 (2001), no month.
Larminie, James et Al., "Fuel Cell Systems Explained", *John Wiley & Sons, Ltd., publisher*, pp. 54–59 (Copyright 2000), no month.
Wintersgill, Mory C., "Complex Impedance Measurements on Nuflon", *Electrochimica Acta*. vol. 43, Nos. 10–11, pp. 1533–1538 (1993), no month.
Felix N. Büchi, et al., "In Sim Membrane Resistance Measurements in Polymer Electrolyte Fuel Cells by Fast Auxillary Current Pulses", J. Electrochem, Soc., vol. 142, No. 6, Jun. 1995, pps. 1895–1901.
Tony Thampan, "Modeling of Conductive Transport in Proton–Exchange Membranes for Fuel Cells", J. Electrochem. Soc., vol. 147, 2000, pps. 3242–3250, no month.

* cited by examiner

*Primary Examiner*—John S. Maples
(74) *Attorney, Agent, or Firm*—Wells St. John P.S.

(57) ABSTRACT

A fuel cell power system comprising a fuel cell having a cathode and an anode adapted to be coupled to a fuel supply, and which is configured to produce electrical power having a current and voltage output; a controller electrically coupled with the fuel cell, and configured to selectively short the anode to the cathode of the fuel cell; and circuitry configured to measure resistance of the fuel cell in timed relation to the shorting.

1 Claim, 14 Drawing Sheets

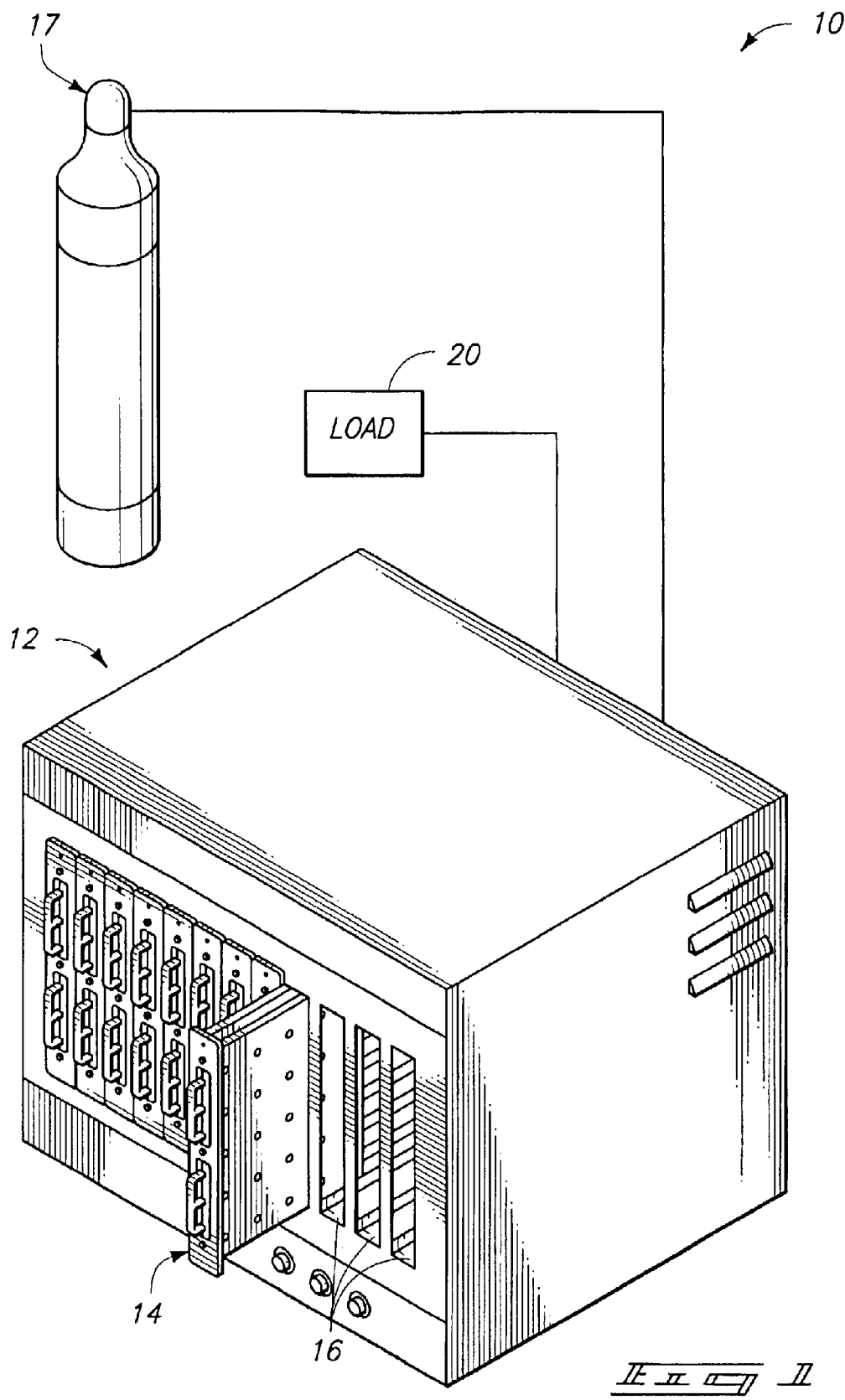

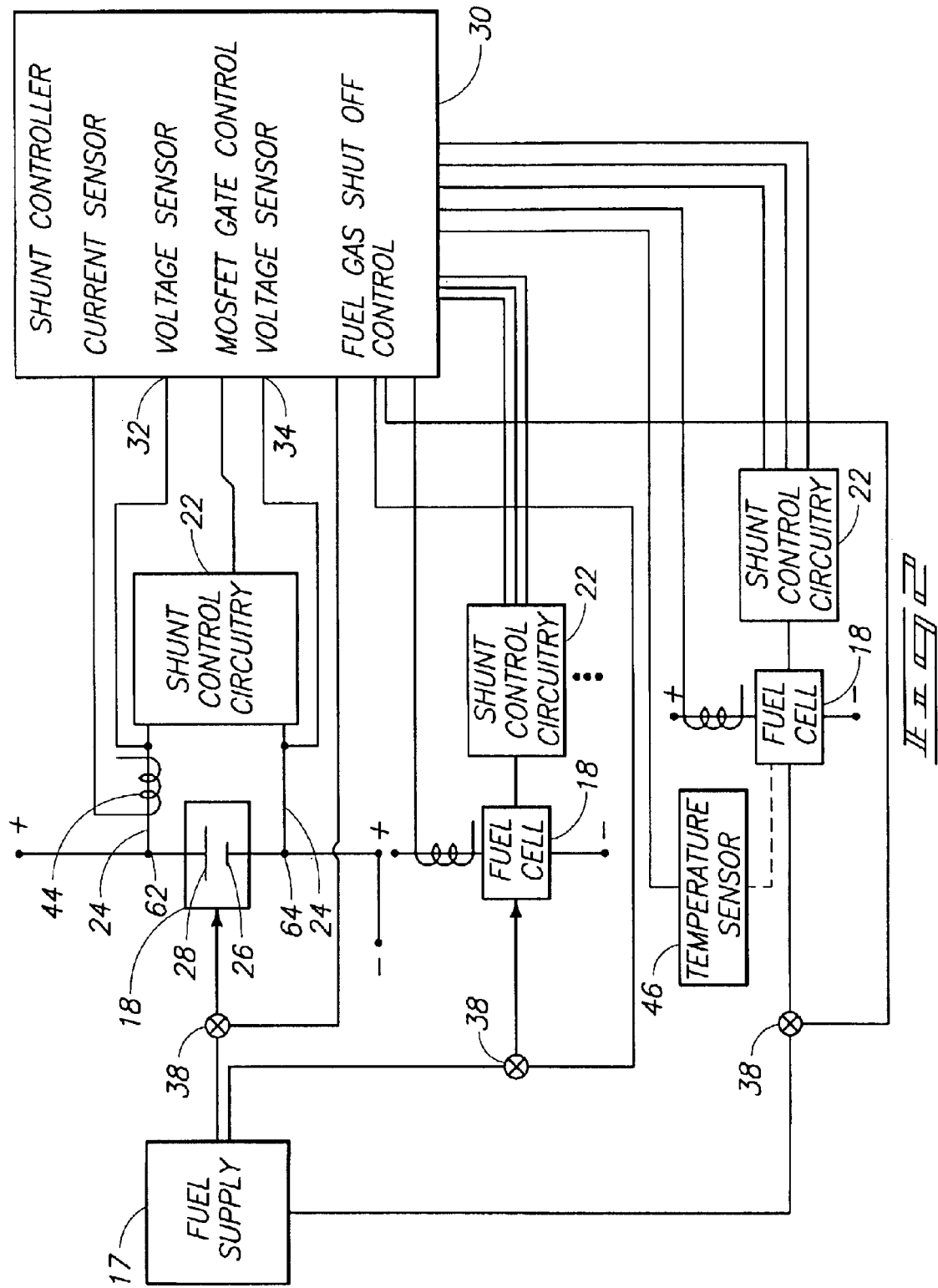

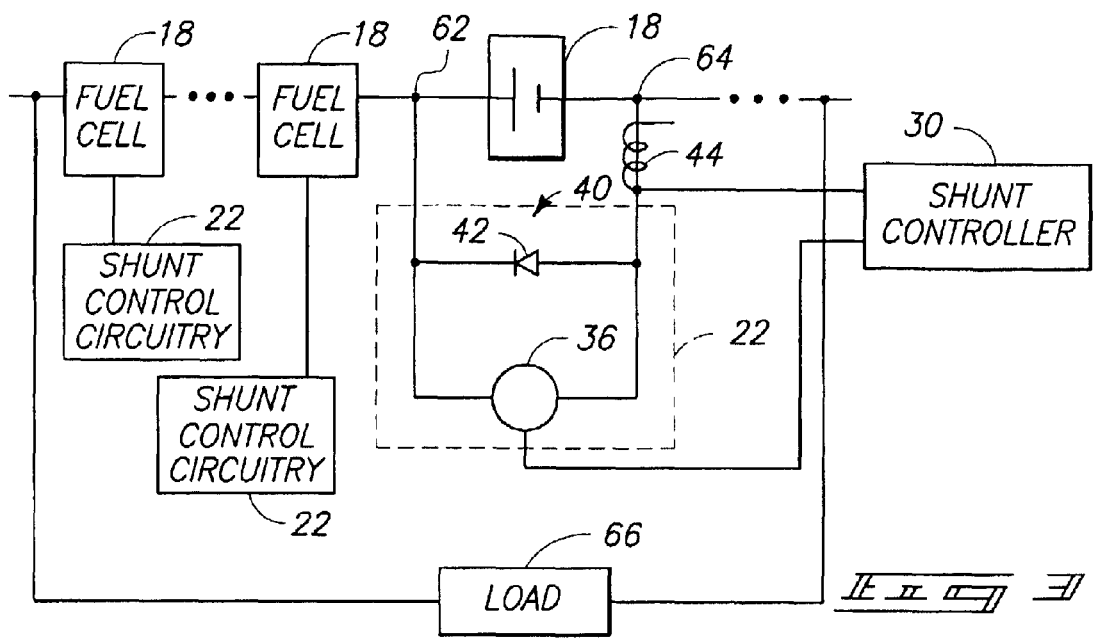
_FIG_ 3
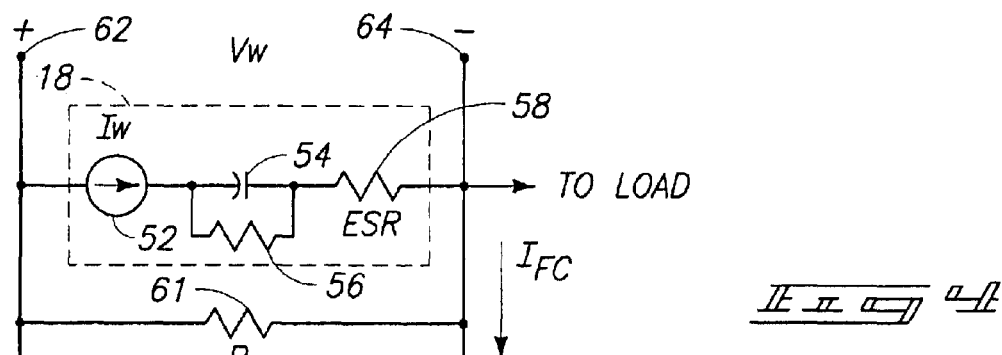
_FIG_ 4
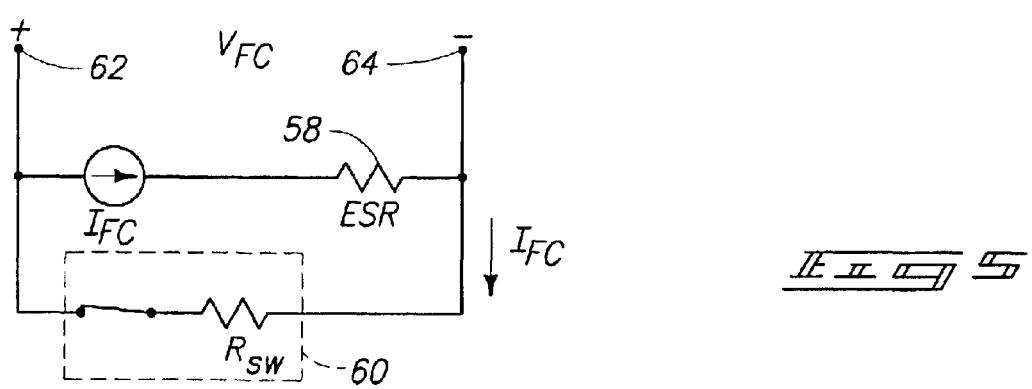
_FIG_ 5

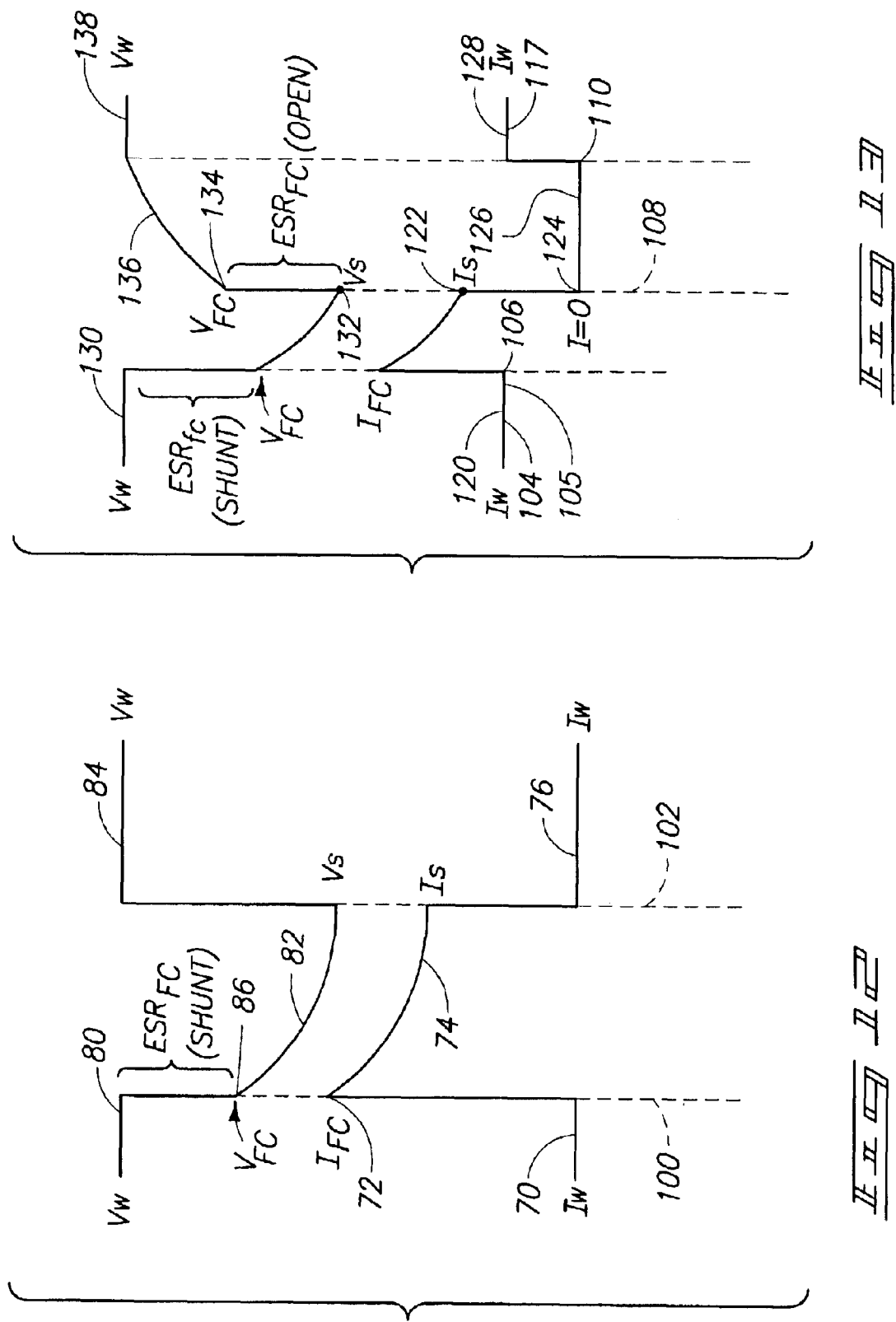

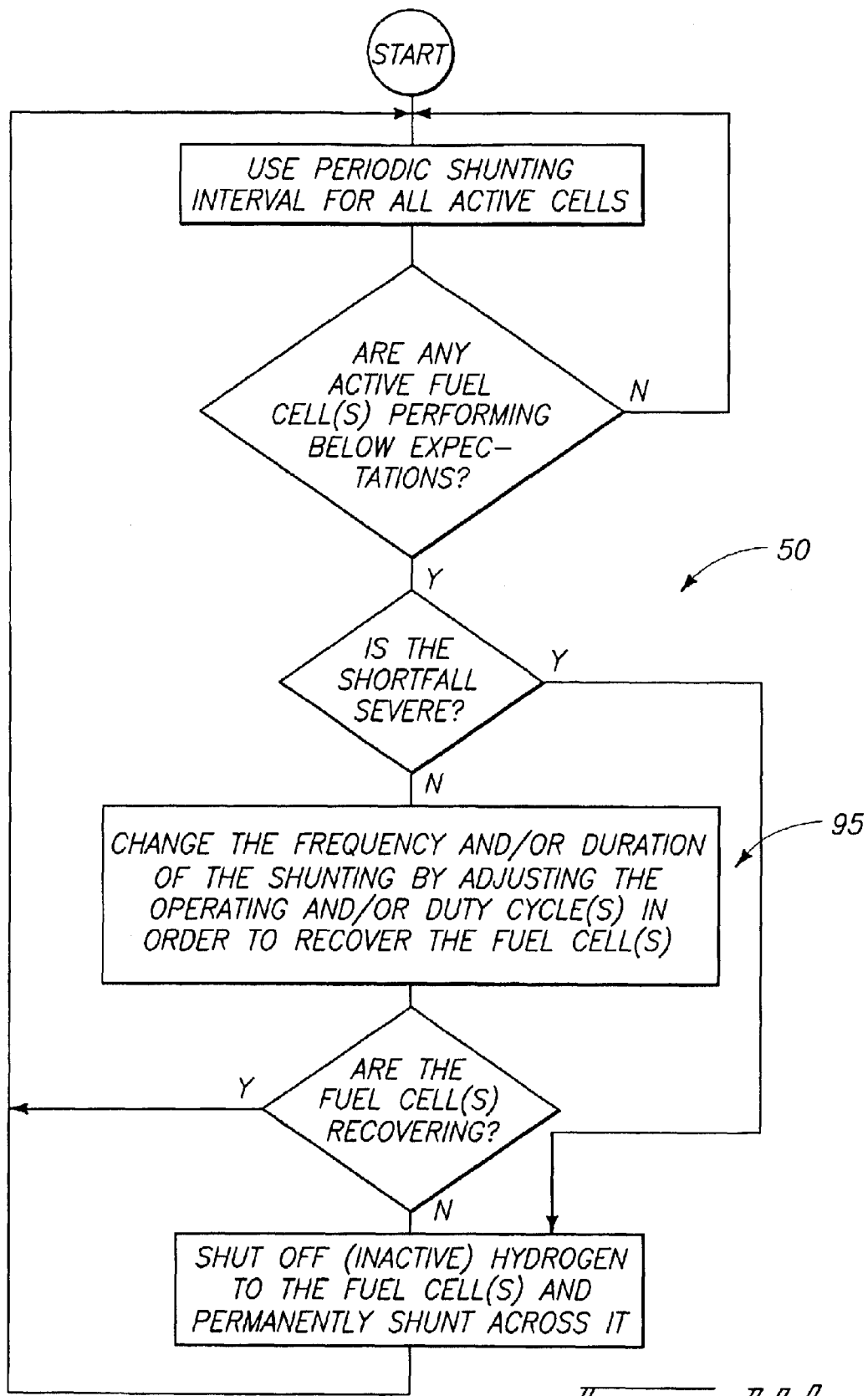

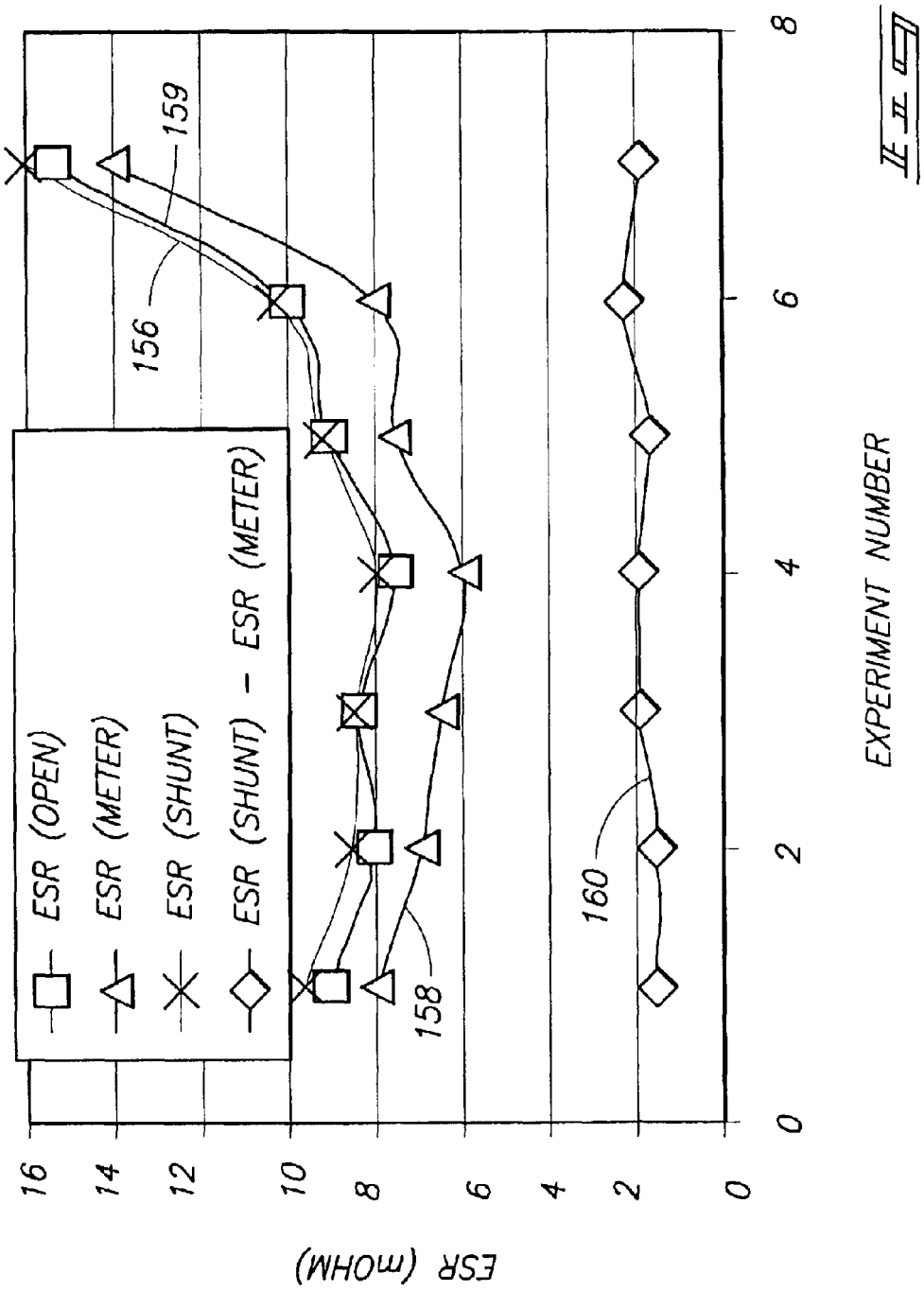

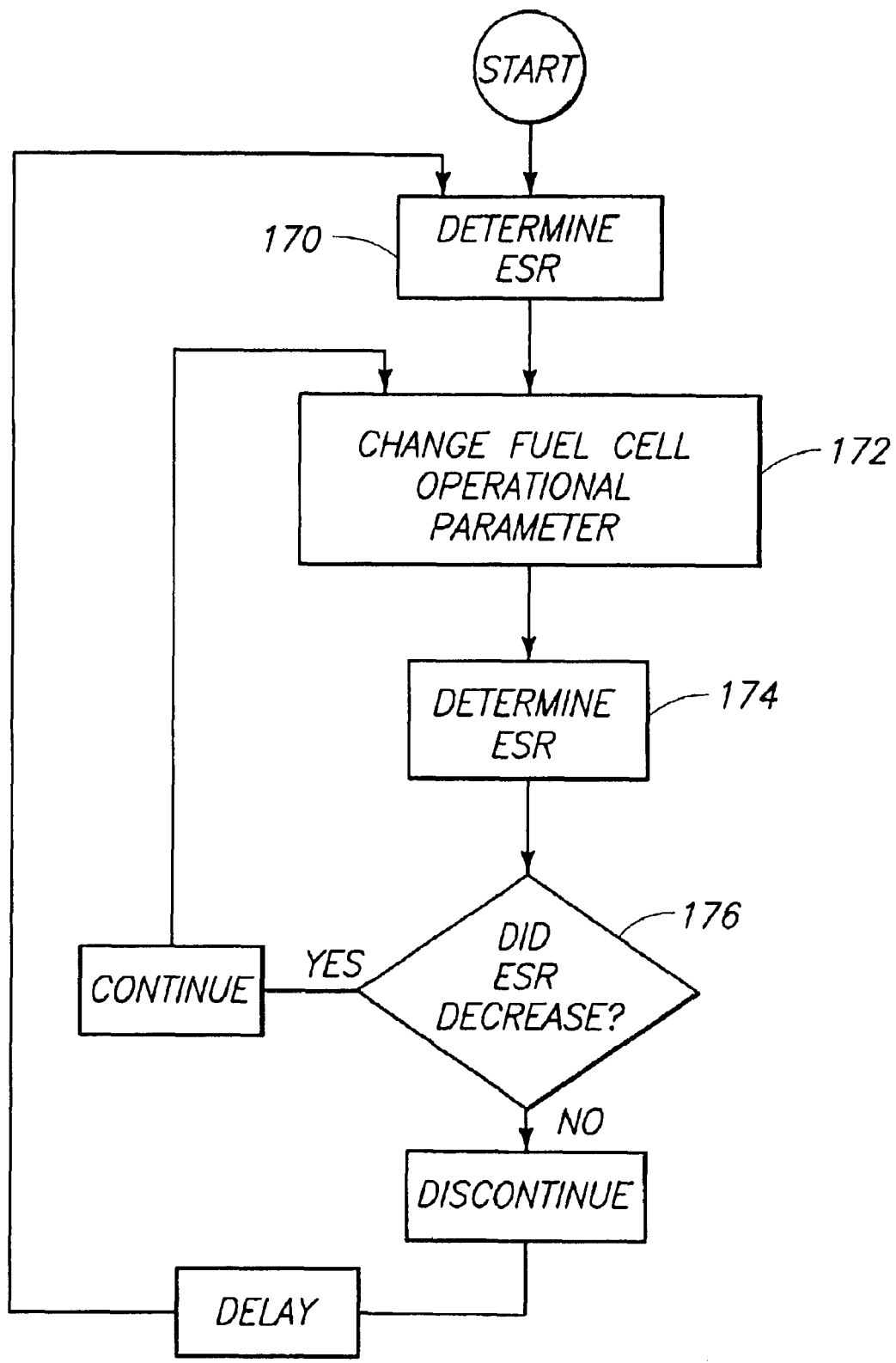

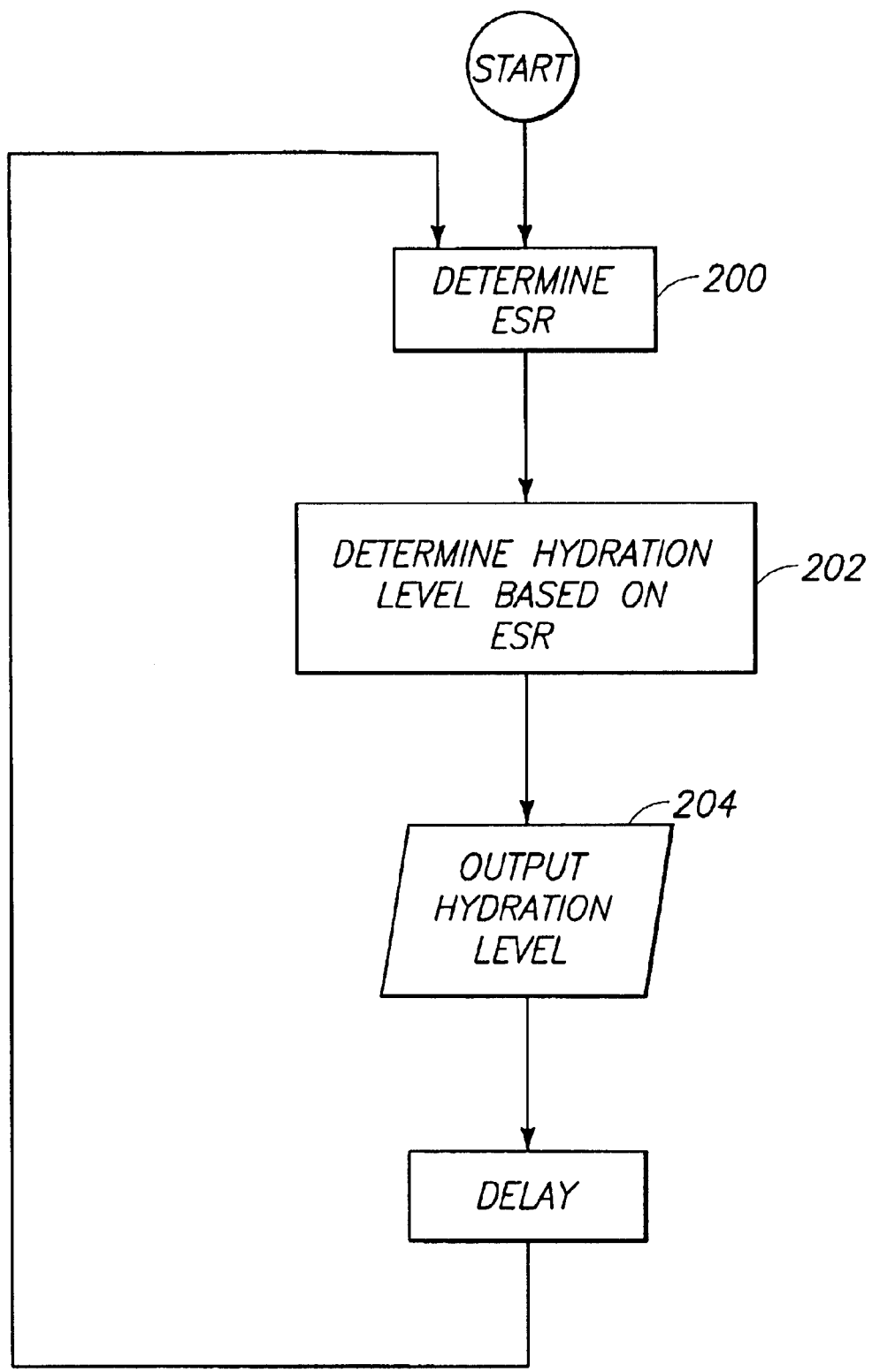

METHOD AND APPARATUS FOR MONITORING EQUIVALENT SERIES RESISTANCE AND FOR SHUNTING A FUEL CELL

CROSS REFERENCE TO RELATED APPLICATION

This is a Divisional of application Ser. No. 10/056,543, filed Jan. 23, 2002, now U.S. Pat. No. 6,620,538 and titled "Method and Apparatus for Monitoring Equivalent Series Resistance and for Shunting a Fuel Cell".

TECHNICAL FIELD

The invention relates to fuel cells. The invention also relates to determining equivalent series resistance of fuel cells and to shunting fuel cells.

BACKGROUND OF THE INVENTION

Fuel cells are well known in the art. A fuel cell is an electrochemical device which reacts a fuel and an oxidant to produce electricity and water. A typical fuel supplied to a fuel cell is hydrogen, and a typical oxidant supplied to a fuel cell is oxygen (or ambient air). Other fuels or oxidants can be employed depending upon the operational conditions.

The basic process in a fuel cell is highly efficient, and for those fuel cells fueled directly by hydrogen, pollution free. Further, since fuel cells can be assembled into stacks of various sizes, power systems have been developed to produce a wide range of electrical power outputs and thus can be employed in numerous commercial applications. The teachings of the following patents, U.S. Pat. Nos. 4,599,282; 4,590,135; 4,599,282; 4,689,280; 5,242,764; 5,858,569; 5,981,098; 6,013,386; 6,017,648; 6,030,718; 6,040,072; 6,040,076; 6,096,449; 6,132,895; 6,171,720; 6,207,308; 6,218,039; and 6,261,710 are incorporated by reference herein.

A fuel cell produces an electromotive force by reacting fuel and oxygen at respective electrode interfaces which share a common electrolyte.

In a fuel cell, fuel such as hydrogen gas is introduced at a first electrode (anode) where it reacts electrochemically in the presence of a catalyst to produce electrons and protons. The electrons are circulated from the first electrode to a second electrode (cathode) through an electrical circuit which couples these respective electrodes. Further, the protons pass through an electrolyte to the second electrode (cathode). Simultaneously, an oxidant, such as oxygen gas, (or air), is introduced to the second electrode where the oxidant reacts electrochemically in the presence of the catalyst and is combined with the electrons from the electrical circuit and the protons (having come across the electrolyte) thus forming water. This reaction further completes the electrical circuit.

The following half cell reactions take place:

$H_2 \rightarrow 2H^+ + 2e-$ (1)

$(\frac{1}{2})O_2 + 2H^+ + 2e- \rightarrow H_2O$ (2)

As noted above the fuel-side electrode is the anode, and the oxygen-side electrode is the cathode. The external electric circuit conveys the generated electrical current and can thus extract electrical power from the cell. The overall fuel cell reaction produces electrical energy which is the sum of the separate half cell reactions occurring in the fuel cell less its internal losses.

Although the fundamental electrochemical processes involved in all fuel cells are well understood, engineering solutions have proved elusive for making certain fuel cell types reliable, and for others economical. In the case of polymer electrolyte membrane (PEM) fuel cell power systems reliability has not been the driving concern to date, but rather the installed cost per watt of generation capacity has. More recently, and in order to further lower the PEM fuel cell cost per watt, much attention has been directed to increasing the power output of same. Historically, this has resulted in additional sophisticated balance-of-plant systems which are necessary to optimize and maintain high PEM fuel cell power output. A consequence of highly complex balance-of-plant systems is that they do not readily scale down to low capacity applications. Consequently, cost, efficiency, reliability and maintenance expenses are all adversely effected in low generation applications.

It is known that PEM fuel cells can operate at higher power output levels when supplemental humidification is made available to the proton exchange membrane (electrolyte). In this regard, humidification lowers the resistance of proton exchange membranes to proton flow. To achieve this increased humidification, supplemental water can be introduced into the hydrogen or oxygen streams by various methods, or more directly to the proton exchange membrane by means of the physical phenomenon known as of wicking, for example. The focus of investigations, however, in recent years has been to develop membrane electrode assemblies (MEA) with increasingly improved power output when running without supplemental humidification. Being able to run an MEA when it is self-humidified is advantageous because it decreases the complexity of the balance-of-plant with its associated costs. However, self-humidification heretofore has resulted in fuel cells running at lower current densities and thus, in turn, has resulted in more of these assemblies being required in order to generate a given amount of power.

While PEM fuel cells of various designs have operated with varying degrees of success, they have also had shortcomings which have detracted from their usefulness. For example, PEM fuel cell power systems typically have a number of individual fuel cells which are serially electrically connected (stacked) together so that the power system can have a increased output voltage. In this arrangement, if one of the fuel cells in the stack fails, it no longer contributes voltage and power. One of the more common failures of such PEM fuel cell power systems is where a membrane electrode assembly (MEA) becomes less hydrated than other MEAs in the same fuel cell stack. This loss of membrane hydration increases the electrical resistance of the effected fuel cell, and thus results in more waste heat being generated. In turn, this additional heat drys out the membrane electrode assembly. This situation creates a negative hydration spiral. The continual overheating of the fuel cell can eventually cause the polarity of the effected fuel cell to reverse such that it now begins to dissipate electrical power from the rest of the fuel cells in the stack. If this condition is not rectified, excessive heat generated by the failing fuel cell will cause the membrane electrode assembly to perforate and thereby leak hydrogen. When this perforation occurs the fuel cell stack must be completely disassembled and repaired. Depending upon the design of fuel cell stack being employed, this repair or replacement may be a costly, and time consuming endeavor.

Some of these problems are solved by fuel cell systems including removable modules as described in commonly assigned patents. For example, commonly assigned U.S. Pat.

No. 6,218,035 to Fuglevand et al., incorporated herein by reference, discloses a proton exchange membrane fuel cell power system including a plurality of discrete fuel cell modules having multiple membrane electrode diffusion assemblies. Each of the membrane electrode diffusion assemblies have opposite anode and cathode sides. Current collectors are individually disposed in juxtaposed ohmic electrical contact with opposite anode and cathode sides of each of the membrane electrode diffusion assemblies. Individual force application assemblies apply a given force to the current collectors and the individual membrane electrode diffusion assemblies. The proton exchange membrane fuel cell power system also includes an enclosure mounting a plurality of subracks which receive the discrete fuel cell modules. In such a modular design, if one fuel module fails, it can be removed and replaced without the difficulty of disassembling a stack.

Attention is directed to U.S. Pat. No. 6,096,449 to Fuglevand et al., which relates to the humidification problem, and which is incorporated by reference herein. This patent discloses a shunt controller which is electrically coupled with a fuel cell and which, at times, shunts electrical current between the anode and cathode of the fuel cell. The controller comprises voltage and current sensors which are disposed in voltage and current sensing relation relative to the electrical power output of the fuel cell. The controller, under certain circumstances or at times (e.g., if voltage or current output of the fuel cell is below a predetermined minimum), closes an electrical switch to shunt current between the anode and the cathode of the fuel cell. Substantially simultaneously, the controller causes a valve to terminate the supply of fuel gas to the fuel cell. Alternatively, the shunt controller periodically shorts current between the anode and cathode of the fuel cell, while simultaneously allowing substantially continuous delivery of fuel gas to the fuel cell. The periodic shorting increases the overall electrical power output of the fuel cell. It is speculated that this repeated, and periodic shorting causes each of the fuel cells to be "conditioned", that is, such shorting is believed to cause an increase in the amount of water that is made available to the MEA of the fuel cell thereby increasing the MEAs performance. It is also conceivable that the shorting provides a short term increase in heat dissipation that is sufficient to evaporate excess water from the diffuser layers which are mounted on the MEA. This evaporation of water thus makes more oxygen from the ambient air available to the cathode side of the MEA. Whatever the cause, the shorting appears to increase the proton conductivity of the MEA. This increase in proton conductivity results in a momentary increase in the power output of the fuel cell which diminishes slowly over time. The overall increase in the electrical power output of the fuel cell, as controlled by the adjustably sequential and periodic shorting of individual, and groups of fuel cells, results in the entire serially connected group of fuel cells to increase in its overall power production.

All circuits, including circuits that appear in circuit schematics to be mostly capacitive or inductive circuits, or that do not even contain resistors, still posses some value of resistance. This resistance is referred to as ESR (Equivalent Series Resistance), and an ESR value is typically quoted for capacitors.

While ESR of a fuel cell can easily be measured on a test bench, in situ measurement of resistance a fuel cell is not convenient. ESR could be measured in fuel cells using high frequency AC techniques, by applying an AC current through a fuel cell membrane and measuring voltage across the membrane. However, high frequency equipment is very expensive and therefore not economically included in fuel cell installations. Further, an AC power source is not always available, particularly with a fuel cell used in a DC application.

It is known that there is a relationship between ESR of a fuel cell and level of hydration of a fuel cell. This is described, for example in an article by P. D. Beattie et al titled "Ionic Conductivity of Proton Exchange Membranes," *Journal of Electroanalytical Chemistry*, Volume 503 (2001), pp. 45–56.

Therefore, it would be useful to be able to be able to economically measure ESR of a fuel cell, in situ, in an operating fuel cell system without having to use AC high frequency measurement equipment.

BRIEF DESCRIPTION OF THE DRAWINGS

Preferred embodiments of the invention are described below with reference to the following accompanying drawings.

FIG. 1 is a perspective view of a fuel cell power system, including PEM fuel cell modules and a subrack, in accordance with the invention.

FIG. 2 is a simplified schematic representation of electrical circuitry used in the fuel cell power system of FIG. 1.

FIG. 3 is a circuit diagram showing shunt control circuitry in accordance with one embodiment.

FIG. 4. is an equivalent circuit diagram of the circuitry of FIG. 3 before shorting of a fuel cell that occurs during a shunting operation.

FIG. 5 is an equivalent circuit diagram of the circuitry of FIG. 3 during shorting of a fuel cell that occurs during a shunting operation.

FIG. 12 is a plot of voltage and current versus time during a shunting operation using the circuitry of FIG. 3.

FIG. 13 is a plot of voltage and current versus time during a shunting operation using the circuitry of FIG. 6.

FIG. 14 is a flow chart of logic implemented by the circuit of FIG. 2.

FIG. 17 is a plot showing the relationship of fuel cell Equivalent series resistance versus hydration level and fuel cell current output versus experiments at different hydration values.

FIG. 18 is a plot of ESR of the fuel cell and shunting circuitry verus experiments at different hydration values.

FIG. 21 is flow chart of logic implemented by the circuit of FIG. 2 in another alternative embodiment.

FIG. 22 is flow chart of logic implemented by the circuit of FIG. 2 in another alternative embodiment.

DETAILED DESCRIPTION OF THE PREFERRED EMBODIMENTS

Figure 6:
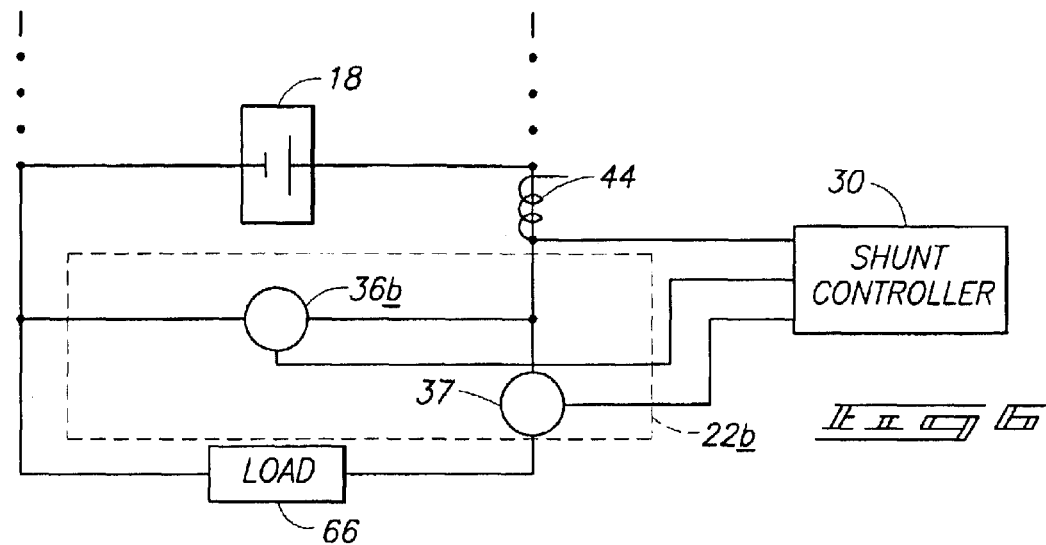
FIG. 6 is a circuit diagram showing shunt control circuitry in accordance with another embodiment.

This disclosure of the invention is submitted in furtherance of the constitutional purposes of the U.S. patent Laws "to promote the progress of science and useful arts" (Article 1, Section 8).

The invention provides a fuel cell power system comprising a fuel cell having a cathode and an anode adapted to be coupled to a fuel supply, and which is configured to produce electrical power having a current and voltage output; a controller electrically coupled with the fuel cell, and configured to selectively short the anode to the cathode of the fuel cell; and circuitry configured to measure resistance of the fuel cell in timed relation to the shorting.

One aspect of the invention relates to a fuel cell power system comprising at least one fuel cell configured to supply power to a load, and circuitry configured to measure equivalent series resistance of at least one fuel cell of the power system while the power system continues to substantially serve the load.

Another aspect of the invention relates to a fuel cell power system comprising a pair of output terminals; a plurality of fuel cells respectively having an anode adapted to be coupled to a fuel supply, and a cathode, which fuel cells are selectively coupled to the output terminals, and which, in operation, convert chemical energy into electrical power having a current and voltage output, wherein one or more of the fuel cells are selectively decoupled from the output terminals while other fuel cells continue to provide power to the output terminals; and circuitry configured to measure the equivalent series resistance of one of the decoupled fuel cells in situ while the other fuel cells continue to produce electrical power.

Another aspect of the invention relates to a fuel cell power system comprising a fuel cell having a cathode and an anode adapted to be coupled to a fuel supply, and configured to produce electrical power having a current and voltage output; a voltage sensor; a current sensor; and a controller electrically coupled with the fuel cell, the voltage sensor, and the current sensor, and configured to, at times, perform a shunting operation including shorting the anode to the cathode of the fuel cell according to a duty cycle, the controller further being configured to determine equivalent series resistance of the fuel cell based on fuel cell current and voltage changes during a shunting operation, determined using the current sensor and voltage sensor, and the controller being configured to selectively adjust the duty cycle in response to the determined equivalent series resistance.

Another aspect of the invention relates to a fuel cell power system comprising at least one fuel cell configured to supply power to a load, and circuitry configured to determine hydration level of at least one fuel cell of the power system while the power system continues to substantially serve the load.

Another aspect of the invention relates to a fuel cell power method comprising providing a fuel cell having a cathode and an anode adapted to be coupled to a fuel supply, and configured to produce electrical power having a current and voltage output; selectively shorting the anode of the fuel cell to the cathode of the fuel cell; and measuring resistance of the fuel cell in timed relation to the shorting.

Another aspect of the invention relates to a fuel cell power method comprising supplying power to a load using at least one fuel cell, and measuring equivalent series resistance of at least one of the fuel cells while power is continued to be substantially supplied the load.

Another aspect of the invention relates to a fuel cell power method comprising providing a pair of output terminals; providing a plurality of fuel cells respectively having an anode adapted to be coupled to a fuel supply, and a cathode, which fuel cells are selectively coupled to the output terminals, and which, in operation, convert chemical energy into electrical power having a current and voltage output, wherein one or more of the fuel cells are selectively decoupled from the output terminals while other fuel cells continue to provide power to the output terminals; and measuring equivalent series resistance of one of the fuel cells, in situ, while the other fuel cells continue to produce electrical power. In one embodiment, equivalent series resistance is determined while the fuel cell for which equivalent series resistance is being determined continues to provide power to output terminals; e.g., by pulsing the current output.

Another aspect of the invention relates to a fuel cell power method comprising providing a fuel cell having a cathode and an anode adapted to be coupled to a fuel supply, and configured to produce electrical power having a current and voltage output; providing a voltage sensor; providing a current sensor; and at times, performing a shunting operation including shorting the anode to the cathode of the fuel cell according to a duty cycle, and determining equivalent series resistance of the fuel cell based on fuel cell current and voltage during a shunting operation, and using the current sensor and voltage sensor, and selectively adjusting the duty cycle in response to the determined equivalent series resistance.

Yet another aspect of the invention relates to a method comprising providing a fuel cell power system including at least one fuel cell configured to supply power to a load; and determining hydration level of at least one fuel cell of the power system while the power system continues to substantially serve the load.

Yet another aspect of the invention relates to a method comprising providing a fuel cell having an anode and a cathode and having a level of hydration; applying a short from the anode to the cathode for a predetermined amount of time; removing the short; measuring the amount of time for current to recover after the short between the anode and the cathode of the fuel cell is removed; and determining what the level of hydration of the fuel cell was prior to the shorting, in response to the measured amount of time.

Referring to FIG. 1, one configuration of an ion exchange membrane fuel cell power system 10 is illustrated. The depicted configuration of fuel cell power system 10 is exemplary and other configurations are possible. As shown, fuel cell power system 10 includes a housing 12 releasably supporting a plurality of hand manipulable fuel cell cartridges 14. Housing 12 defines or is a portion of a subrack assembly in one embodiment.

A plurality of individual module apertures 16 are formed in the front of the housing 12, and are operable to individually receive the respective fuel cell modules 14, and position them in predetermined spaced relation, one to the other.

The fuel cell power system is configured in a manner where at least one of the fuel cell modules 14 can be easily removed from at least one of the subracks by hand, while the remaining modules continue to operate. This removal is normally accomplished without the use of any tools, however it may be necessary in some commercial or industrial applications where vibration, and other outside physical forces may be imparted to the system, to use threaded fasteners and the like to releasably secure the individual modules to the subrack to prevent the unintentional displacement or dislocation of the respective modules from the subrack. If utilized, the hand tools which will be employed will be simple hand tools, and the removal will be accomplished in minutes, as opposed the prior art stack arrangements where replacement of a damaged membrane electrode assembly (MEA) may take hours to accomplish.

The fuel cell power system 10 includes conduit and connectors (not shown) to couple the fuel cell cartridges to a fuel supply 17. The fuel cell power system 10 further includes electrical connectors and conductors (not shown) to couple the electrical output of the fuel cell cartridges 14 to a load 20.

Each fuel cell cartridge 14 includes a plurality of membrane-electrode assemblies (MEAs). One fuel cell power system is disclosed in U.S. patent application Ser. No. 09/577,407, titled Ion Exchange Membrane Fuel Cell, and Ion Exchange Membrane Fuel Cell Power System, naming as inventors William A. Fuglevand, Peter D. DeVries, Greg A. Lloyd, David R. Lott, and John P. Scartozzi, and incorporated by reference herein. This application describes fuel cells constructed of MEAs in detail. An alternative embodiment is described in significant detail in U.S. patent application Ser. No. 08/979,853, and which was filed on Nov. 20, 1997, the teachings of which are incorporated by reference herein.

The membrane electrode assembly (MEA) has a main body (not shown) formed of a solid electrolyte. The main body of the MEA has an anode side, and an opposite cathode side. Catalytic anode electrode and catalytic cathode electrode are formed on the main body. These electrodes are further described in the aforementioned incorporated U.S. patent application Ser. No. 09/577,407. Additionally, noncatalytic, electrically conductive diffusion layers, not shown, are affixed on the anode and cathode electrodes and have a given porosity. These noncatalytic electrically conductive diffusion layers are also described in the aforementioned patent application, but for purposes of brevity, are not discussed in further detail herein.

Referring now to FIG. 2, a plurality of fuel cells 18 are shown configured to produce electrical current having a given voltage and current output. In the embodiment shown in FIG. 2, only a few fuel cells 18 are illustrated, for simplicity. However, in actuality, a plurality of fuel cells 18 are provided which can be coupled together in series, parallel, or combination series/parallel arrangements. More particularly, one or more fuel cells 18 are contained in each cartridge 14 in series, parallel, or a series/parallel combination.

The power system 10 includes shunt control circuitry 22 shown in FIG. 2. There are multiple alternative forms of shunt control circuitry 22. Two alternative embodiments of shunt control circuitry 22 are described below in connection with FIG. 3 and FIG. 6. The shunt control circuitry 22 includes an electrical path 24 which electrically couples the anode 26 and cathode 28 of one of the fuel cells together. It should be understood that this shunt control circuitry 22 is present for or otherwise associated with each of the fuel cells. In one embodiment (not shown), the electrical path 24 comprises an ultracapacitor to temporarily store the energy generated during the shunting period. The energy that would otherwise be wasted, can be recovered by using an ultracapacitor in the electrical path 24.

The power system 10 further includes a shunt controller 30. In one embodiment, all of the shunt control circuits 22 of fuel cell power system 10 are electrically coupled to a common shunt controller 30; alternatively, multiple shunt controllers 30 can be employed. In one embodiment, the shunt controller 30 may be purchased through conventional retail sources. A suitable controller 30 for this application is the programmable microcontroller chip having the trade designation MC68HC705P6A, and which may be utilized to perform the program logic described below.

The shunt controller 30 includes a pair of voltage sensor electrodes (or a pair of voltage sensors) 32 and 34 for each fuel cell 18 and which are electrically coupled with the anode 26 and cathode 28, respectively, to sense the voltage at the anode and cathode 26 and 28 of the fuel cell 18.

The power system 10 further includes a current sensor 44 electrically coupled between the shunt controller 30 and the fuel cell 18 for use by the shunt controller 30 in detecting current flowing from the fuel cell 18. In one embodiment, the current sensor is in the form of a current shunt that detects current flowing from the fuel cell 18 with a direct electrical connection to the fuel cell 18. In the illustrated embodiment, without a direct electrical connection, the current sensor 44 is a current transformer. Other types of current sensors known in the art could also be employed. In one embodiment, the current sensors 44 and voltage sensors 32 are separate from the shunt controller 30, though the shunt controller 30 includes circuitry used in reading the current and voltage sensors; however, in alternative embodiments, some or all of the voltage and current sensors are included in the shunt controller 30.

The fuel cell power system 10 further includes fuel shutoff valves 38 which are disposed in fluid metering relation relative to the supply 17 of fuel gas. The shunt controller 30 is electrically coupled in controlling relation relative to the valves 38.

In one embodiment, the fuel cell power system 10 further includes a temperature sensor 46 for sensing the temperature of one or more fuel cells. For example, one temperature sensor can be provided per cartridge 14 supported by the housing, such as inside the apertures 16, or temperature sensors can be included in the cartridges 14 and coupled by a connector to the shunt controller 30, or temperature sensor can be provided for groups of fuel cells in various locations in the housing 12.

Each fuel cell 18 produces electrical power having a given current and voltage output. The controller 30 is electrically coupled with the fuel cells 18 and is operable to shunt the electrical current between the anode 26 and the cathode 28 of a fuel cell 18 under predetermined operational conditions.

In one embodiment, as will be described below in further detail, the controller 30 upon sensing, by way of the voltage and current sensors 32, 34, and 44, a given voltage and current output of a fuel cell 18, adjusts the valve 38 associated with that fuel cell 18 into a predetermined fluid metering relationship relative to the supply 17 of fuel gas.

FIG. 3 shows construction details of shunt control circuitry 22, in accordance with one embodiment of the invention, suitable for a plurality of fuel cells 18 connected together in series. The shunt control circuitry 22 includes an electrical switch 36, here shown as being a field effect transistor of conventional design. A suitable commercially acceptable MOSFET may be obtained from Mitsubishi, designated FS100UMJ. The shunt controller 30 is electrically coupled to the control electrode (e.g., gate) of the electrical switch 36.

The shunt control circuitry 22 includes bypass electrical circuitry 40 which further electrically couples the anode and cathode 26 and 28 of each of the fuel cells 18 together. The bypass electrical circuitry comprises a diode 42. The bypass electrical circuitry 40 is operable to provide a current flow path from the anode to cathode of a fuel cell 18 upon failure of the shunt controller 30. In the event that the shunt control circuitry 22 fails in conjunction with a failing fuel cell 18, the bypass electrical circuitry 42 prevents fuel cell damage from occurring. The diode 42 is normally reverse biased when the associated fuel cell 18 is producing power, and it has no effect on the shunt control circuitry 22 under normal operational conditions. As the voltage output of a failing fuel cell 18 nears 0 or becomes negative, the diode 42 becomes forward biased. Current can then travel through the diode 42 instead of the fuel cell 18. The maximum negative voltage depends upon the type of diode selected. A Schottky barrier diode which is commercially available as 85CNQ015, is employed, in one embodiment. This model diode allows high current to flow at approximately 0.3 volts. This voltage limitation limits the maximum negative voltage of the fuel cell thereby preventing overheating and subsequent damage.

The field effect transistor 36 has open and closed electrical conditions. The controller 30 positions the field effect transistor in an open or closed electrical condition, based upon predetermined performance parameters for the respective fuel cells 18.

In a first operational condition where a given fuel cell is performing at or below predetermined performance parameters or expectations, the controller 30 is operable to simultaneously cause the valve 38 for that fuel cell to assume a position where it terminates the supply of fuel gas to the fuel cell 18 and places the electrical switch 36 in a closed electrical condition thereby shorting the anode 26 to the cathode 28. This substantially prevents heat related damage from occurring to the fuel cell 18 as might be occasioned when the negative hydration spiral occurs.

If the electrical switch 36 is subsequently placed in the open position, the controller 30 is operable to cause the valve 38 to be placed in a condition which allows the substantially continuous supply of fuel gas to the fuel cell.

When the voltage output of the fuel cell 18 is less than about 0.4 volts, the electrical switch assumes a closed position thereby shorting the anode to the cathode, while simultaneously causing the valve to terminate the supply of fuel gas. A negative hydration spiral can result in excessive heat which causes damage to the MEA. In this first operational condition, the shunt control circuitry 22 is operable to pass the current thereby preventing this damage. Of course, the performance parameters which may trigger the first operational condition can include declining performance parameters; or declining performance parameters in relative comparison to the performance parameters being achieved by other fuel cells 18. Still other parameters not listed herein could also be used.

In a second operational condition, the shunt control circuitry 22 is operable to increase the resulting electrical power output of the fuel cell 18. The fuel cells 18 have predetermined performance parameters comprising selected current and voltage outputs of the fuel cell 18. In the second condition, and where the performance parameters may be merely declining and have not decreased below a minimum threshold, the shunt control circuitry 22 is employed in an effort to restore individual and groups of fuel cells 18 to the given performance parameters. For example, the voltage and current output of one or more fuel cells 18 may begin to decline. As this decline is detected by the shunt controller 30, the controller 30 is operable, by way of the shunt control circuitry 22 to repeatedly short between the anode and cathode of the degraded performance fuel cells 18 at individually discrete rates which are effective to restore the fuel cells to the predetermined performance parameters. In another example, where the performance parameters may be merely declining, the controller 30 is effective to adjust the duty cycle of individual fuel cells 18 by reference to the declining performance parameters of the fuel cell in relative comparison to the performance parameters of other fuel cells to improve the electrical performance of same.

In the first and second operational conditions, the predetermined performance parameters of the individual and serially electrically coupled fuel cells 18 comprise selected current and voltage outputs of the fuel cell 18. These predetermined threshold performance parameters may be determined by various means including but not limited to, experiment; operational history or electrical load, for example. Additionally, the predetermined performance parameters might include, in the first condition, for example, where the performance parameters of the fuel cell are just merely or generally declining over a given time interval; are declining or in a range of less than about 0.4 Volts; or are declining or degrading, generally speaking in relative relation to the performance parameters of other fuel cells 18 with which it is serially electrically coupled. In one embodiment, a given fuel cell is consider to be performing at or below predetermined parameters if the voltage output of the fuel cell is less than about 0.4 Volts, for example.

This list of possible parameters is not all inclusive and many other physical and operational parameters could be monitored, and which would tend to suggest that a selected fuel cell is beginning to fail, and should be disconnected from the stack for repair or replacement if the shortcoming in performance is severe, or on the other hand subjected to increased shorting to determine if the fuel cell 18 can be recovered back to the predetermined performance parameters selected.

The term "duty cycle," as utilized hereinafter, means the ratio of the "on time" interval occupied in operating a device to the total time of one operating cycle (the ratio of the pulse duration time to the pulse-repetition time). Another way of defining the term duty cycle is the ratio of the working time to the total operating time for intermittent operating devices. This duty cycle is expressed as a percentage of the total operating cycle time. In the embodiment of FIG. 2, therefore, the shunt controller 30 is operable to adjust both the duration of the shorting, as well as the operating cycle time as to selective fuel cells in order to restore or maintain the fuel cells above the predetermined performance parameters selected.

Enhanced fuel cell performance can be achieved by adjustably, repeatedly shorting the anode 26 and cathode 28 of the fuel cell 18. In this regard, and in the second operational condition, the programmable logic as shown at 50 in FIG. 14 is utilized by the shunt controller 30 to individually, adjustably and periodically open and close each of the electrical switches 36 that are individually electrically coupled and associated with each of the fuel cells 18. These electrical switches 36 may be activated individually, serially, in given groups, or patterns, or in any fashion to achieve the predetermined voltage and current output desired. In this regard, it has been determined that operating cycle time of about 0.01 seconds to about four minutes produces good results, in one embodiment. When this periodic shorting is implemented, it has been discovered that the voltage output of the fuel cells 18 can increase by at least about 5%. Still further, the shunt control circuitry 30 is operable to shunt the electrical current for a duration of less than about 20% of the operating cycle.

During the second operational condition, the shunt controller 30 causes the valve 38 to remain in a condition which allows the substantially continuous supply of fuel gas to the associated fuel cell 18 during shorting. It is speculated that this repeated, and periodic shorting causes each of the shunted fuel cells 18 to be "conditioned", that is, such shorting is believed to cause an increase in the amount of water that is made available to the MEAs of the fuel cells thereby increasing the MEAs performance. It is also conceivable that the shorting provides a short term increase in heat dissipation that is sufficient to evaporate excess water from the diffuser layers which are mounted on the MEA. This evaporation of water would make more oxygen from the ambient air available to the cathode side of the MEA. Whatever the exact cause, the shunting appears to increase the proton conductivity of the MEA. This increase in proton conductivity results in a momentary increase in the power output of the fuel cell which diminishes slowly over time. The overall increase in the electrical power output of the fuel cell 18, as controlled by the adjustably sequential and periodic shorting of individual, and groups of fuel cells 18, results in the entire group of fuel cells increasing its overall power production. The respective shunt control circuits 22 are individually operably connected with each fuel cell 18, and can be rendered operable for single fuel cells, and groups of fuel cells. Additionally, the duty and operating cycles of the respective fuel cells 18 may be adjusted in any number of different combinations and for individually discrete durations, depending upon the performance of the individual fuel cells, to boost the performance of same; or for purposes of stabilizing the decreasing performance of a given group of fuel cells or individual fuel cells as the case may be.

In the second operational condition, the shunt controller 30, by implementing the logic shown in FIG. 14 at numeral 50 shorts between the anode 26 and cathode 28 of a fuel cell 18 when the associated electrical switch 36 is in the closed condition, while simultaneously maintaining the valve 38 in a condition which allows the substantially continuous delivery of fuel gas to the fuel cell 18 as the shunt controller periodically opens and closes the electrical switch. The fuel cell 18 has a duty cycle; and an operating cycle of about 0.01 seconds to about 4 minutes. The shorting by opening and closing the electrical switch 36 during the duty cycle increases the overall electrical power output of the fuel cell 18. This results in the group of fuel cells 18 increasing in combined voltage and current output by, for example, at least about 5% when in the configuration shown in FIG. 3. The duration of the shorting during the duty cycle is less than about 20% of the operating cycle.

Figure 15:
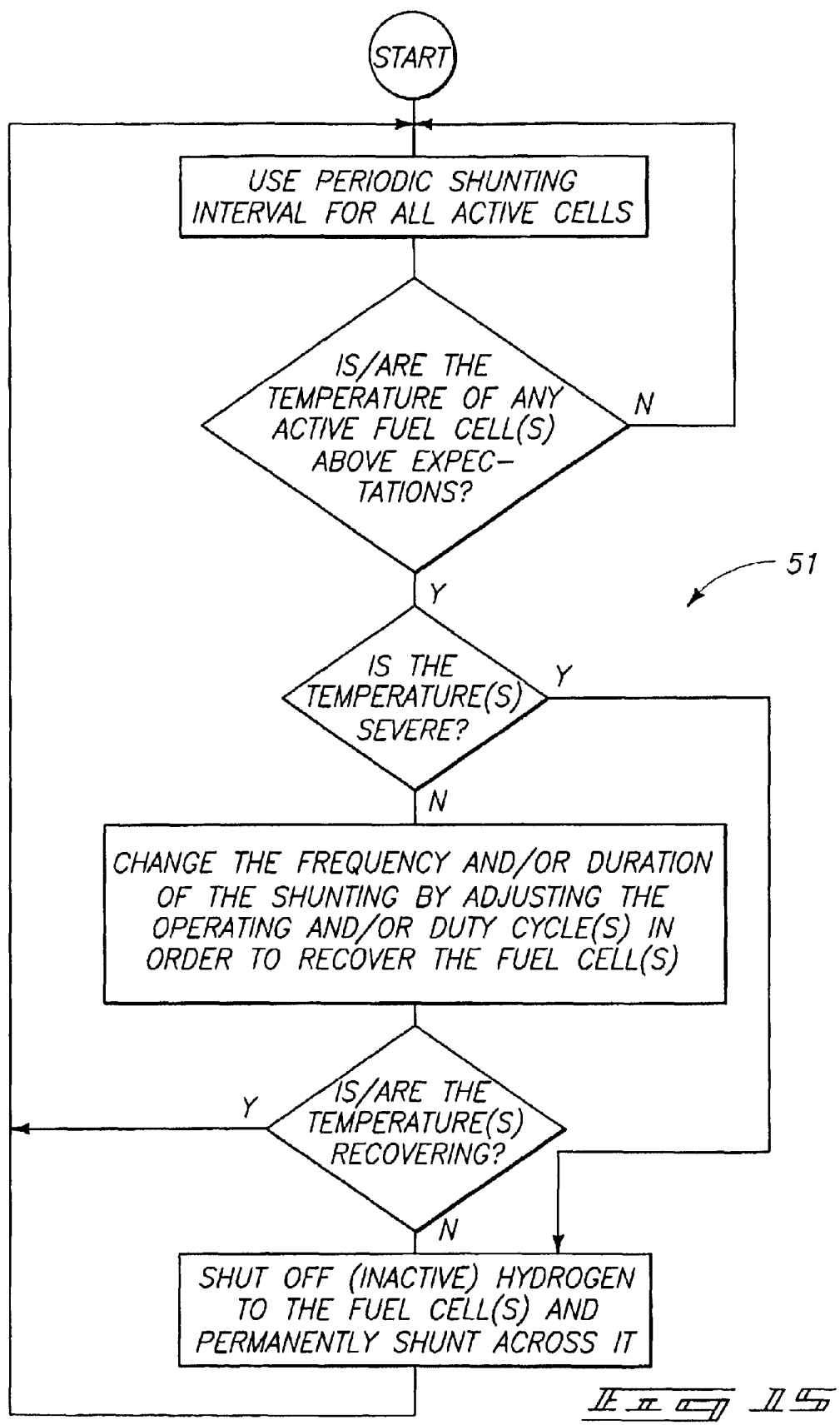
FIG. 15 is a flow chart of logic implemented by the circuit of FIG. 2 in an alternative embodiment.

In one alternative embodiment, shown in FIG. 15, shorting of a fuel cell 18 is controlled in response to temperature sensed by a temperature sensor 46 arranged in temperature sensing arrangement to that fuel cell 18. For example, duty cycle, timing or duration of shorting is adjusted to optimize hydration or increase fuel cell output as indicated by logic 51. If temperature of a fuel cell increases beyond a nominal operating temperature, it can be assumed that hydration is decreasing, so shorting frequency and/or duration is increased. In one embodiment, duty cycle of shorting is adjusted to attempt to equalize the temperature and output of each cartridge; thus, in this embodiment, one temperature sensor is provided in temperature sensing relation to each cartridge.

Figure 16:
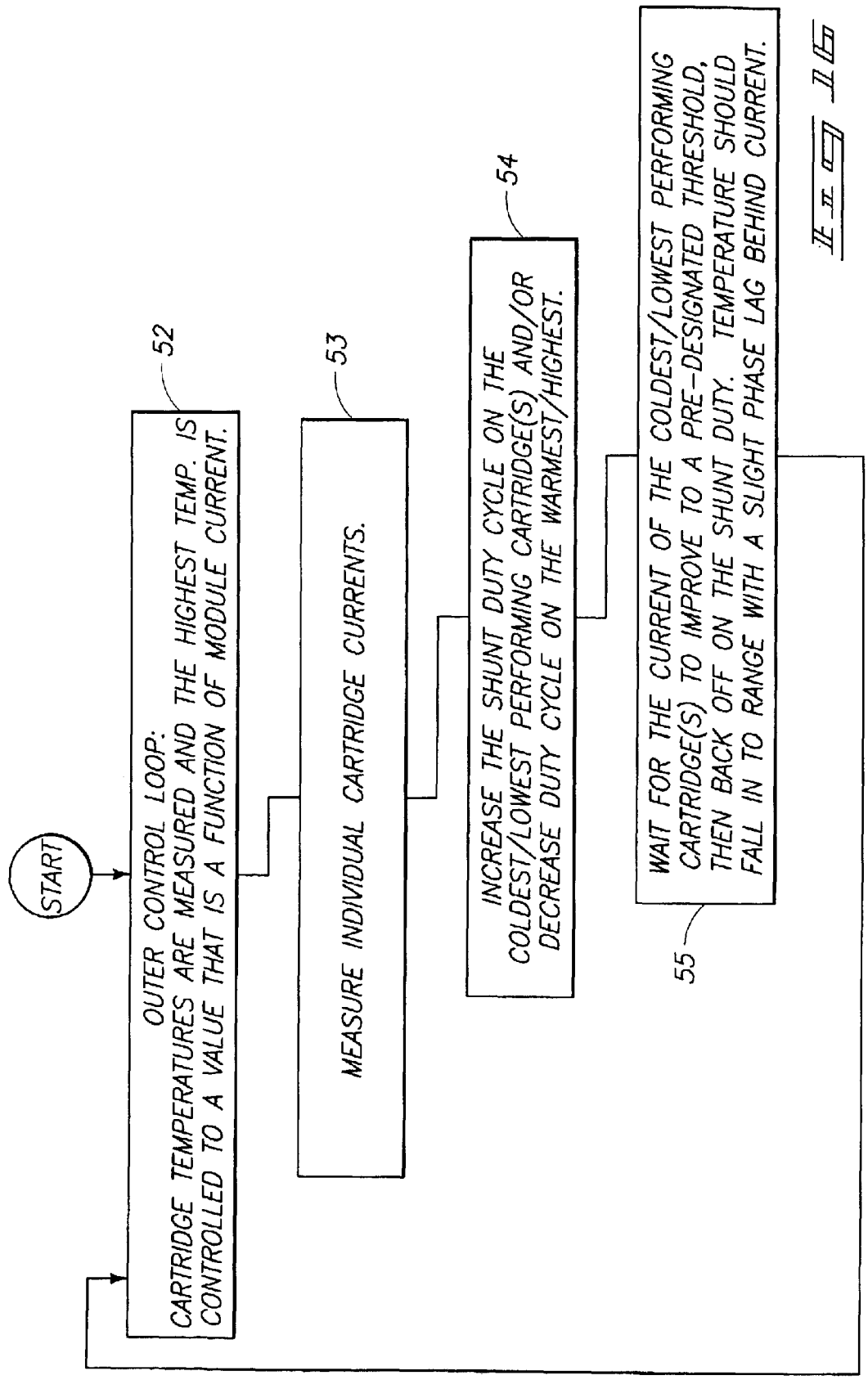
FIG. 16 is a flow chart of logic implemented by the circuit of FIG. 2 in another alternative embodiment.
Figure 11:
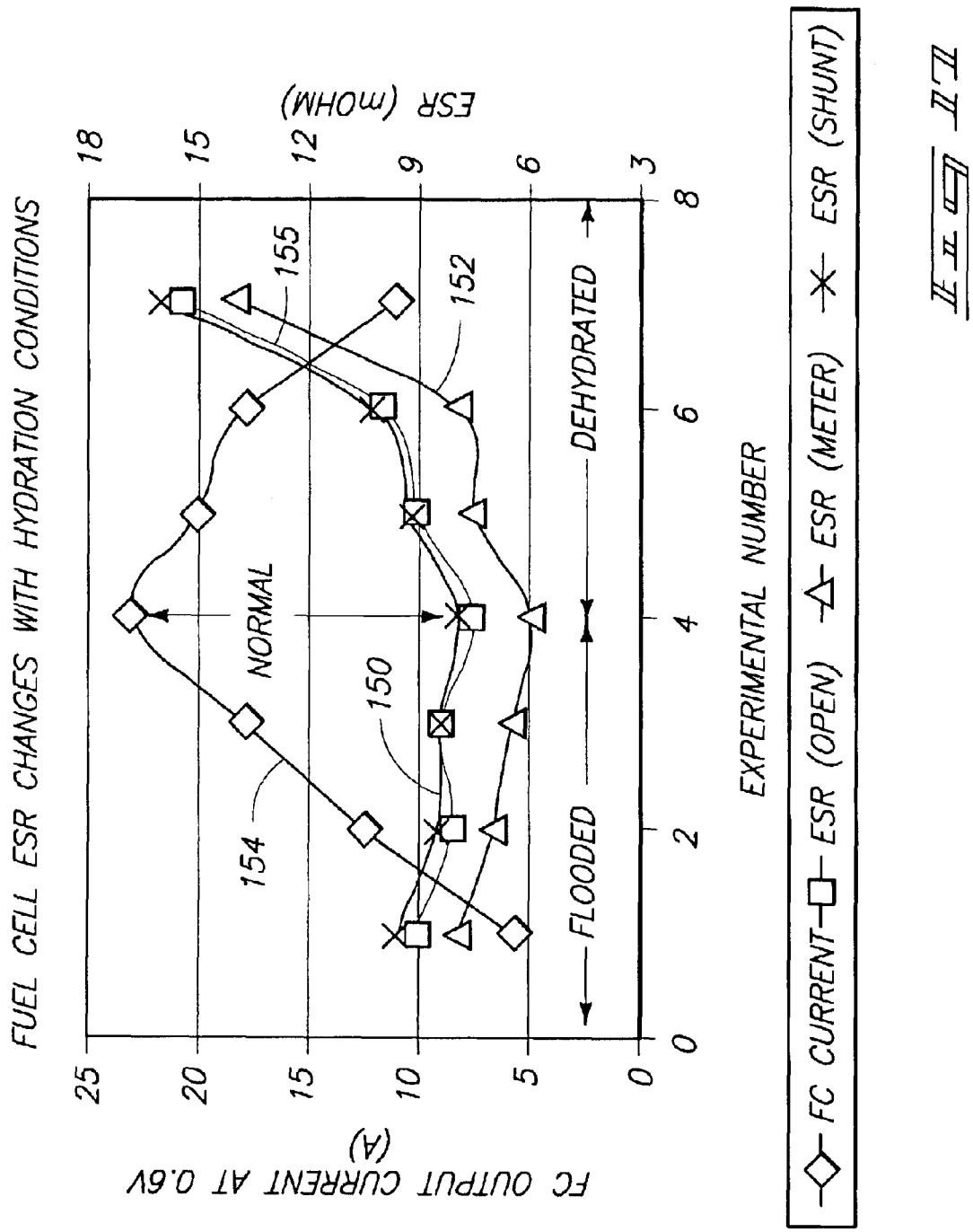

FIG. 16 illustrates logic performed by the shunt controller 30 in another alternative embodiment. Block 52 represents an outer control loop. In block 52, temperatures of cartridges 14 are measured by respective temperature sensors 46, and the highest temperature is controlled to a value that is a function of output current (determined using one or more current sensors 44) for the cartridge 14.

In block 53, current produced by each cartridge 14 is measured. Lower temperature cartridges tend to produce less current.

In block 54, shorting duty cycle is increased for one or more of the coldest or lowest current output cartridges 14 (or poorest performing cartridge determined by considering both temperature and current). In one embodiment, only duration of shorting is increased. In one embodiment, duty cycle is increased for all cartridges that are at a temperature and/or current that is below a predetermined threshold. In one embodiment, shorting normally occurs for, for example, 120 milliseconds every 12 seconds. In block 54, shorting duration for each shunting operation can be increased, for example, by 100 milliseconds (e.g. approx. 83 percent) for all cartridges that are at a temperature and/or current that is below a predetermined threshold; in another embodiment, duration is increased for only the single coldest and/or lowest current output cartridge. Other size steps, such as 10, 20, 50, or 100 percent increases in short duration are employed in alternative embodiments.

In one embodiment, block 54 additionally includes decreasing the duty cycle of one or more of the warmest or highest current output cartridges 14 in a manner similar to that in which duty cycle is increased for the coldest or lowest current output cartridges.

In block 55, there is a delay to wait for the current of the designated one or more of the coldest or lowest current output cartridges 14 to improve. After current output improvement of a predetermined percentage or to a predetermined current level is detected, duty cycle is decreased by a predetermined amount or percentage, such as by reducing duration of shorting by 10, 20, 50, or 100 percent, for example Temperature should fall in range with a slight phase lag (e.g., one minute) behind current. Therefore, in one embodiment, duty cycle is decreased in block 55 when temperature improvement of a predetermined percentage or to a predetermined level of temperature level is detected, instead of current output improvement.

While FIG. 16 was discussed in terms of cartridges, the flowchart of FIG. 16 could be practiced for individual fuel cells or other groups of fuel cells for which current and temperature can be measured.

FIG. 4 is an equivalent circuit diagram of the circuit of FIG. 3, prior to shorting that occurs during a shunting operation. FIG. 4 shows the equivalent series resistance of the fuel cell 18 and equivalent series resistance of the switch 36 of the circuitry of FIG. 3. Each fuel cell 18 has an associated equivalent series resistance value, indicated with reference numeral 58 in FIG. 4. Additionally, the fuel cell can be represented by a current source 52 in series with a parallel combination of a capacitor 54 and a resistor 56. This equivalent circuit configuration for a fuel cell is known in the art and is shown, for example, in FUEL CELLS EXPLAINED, by James Larminie and Andrew Dicks, published by John Wiley & Sons, Ltd., copyright 2000, page 55. Additionally, shunting circuitry (i.e., circuitry including switch 36) has an equivalent series resistance value, indicated with reference numeral 60. The diode 42 has an equivalent series resistance value, indicated with reference numeral 61. In series with other fuel cells 18, the voltage V provided across terminals 62 and 64 is normally applied to a load 66, e.g., at times outside of shunting operations or at times of maintenance or non-use of a particular fuel cell or cartridge.

FIG. 5 is a simplified or equivalent circuit diagram of the circuit of FIG. 3 during shorting. During shorting, the switch 36 is closed and electrical path 24 is formed resulting in a series connection of the fuel cell 18 with the switch 36.

It is a well known relationship that voltage equals current times resistance. The fuel cell 18, switch 36, equivalent series resistance 58 due to the fuel cell and equivalent series resistance 60 due to the switch are all in a series relationship during shorting because, when the switch 36 is closed, there is a closed circuit connection caused by the switch 36 and virtually no current normally flows through the diode 42.

During shorting, the equivalent series resistance 61 due to the diode 42 and the resistance due to the load 66 are both much, much greater than equivalent series resistance 60 due to the switch. Therefore, in the equivalent circuit diagram of FIG. 5, the diode 42 and load 66 are not shown. Also, at the instant when shorting is initiated, the capacitor 54 is shorted, so the capacitor 54 and resistor 56 of FIG. 4 are omitted in FIG. 5. Voltage across the fuel cell 18 is shown in FIG. 5 as $V_{FC}$. It is a well known relationship that voltage equals current multiplied by resistance, or, stated another way, resistance equals voltage divided by current. Equivalent series resistance 58 due to the fuel cell, at the time the short is applied, equals change in voltage across the fuel cell divided by change in current through the fuel cell, or:

$$ESR_{FC} = (V_W - V_{FC})/(I_{FC} - I_W)$$

(see FIG. 12) where $ESR_{FC}$ is the ESR 58, where, where $V_W$ is the normal or work voltage of the fuel cell before the short is applied, $I_W$ is the normal or work current of the fuel cell before the short is applied, $V_{FC}$ is the voltage of the fuel cell 18 immediately after the short is applied, and $I_{FC}$ is current through the fuel cell 18 immediately after the short is applied. Note that in FIG. 3, the load current through load 66 does not go through the sensor 44. Therefore, the current $I_w$ at reference number 70 in FIG. 12 will be zero before the short is applied. In other embodiments, additional sensors are employed and ESR is measured at times other than immediately after a short is applied.

FIG. 12 is a plot showing fuel cell voltage and current versus time before, during, and after shorting that occurs during a shorting operation using the circuitry of FIG. 3. In one embodiment, a shunting operation is defined as including the time during shorting as well as time before and after shorting during which switches are opened or closed in preparation for or after shorting.

In one embodiment, using the circuitry of FIG. 3, equivalent series resistance is determined by measuring the voltage across the fuel cell 18 and current flowing through the fuel cell 18 as soon as shunting begins, at a time 100 in FIG. 12. At time 100, immediately after the short is applied, the hydration level of the fuel cell has not yet changed from the level before the shorting, yet current and voltage change is nearly instantaneous.

Reference numeral 70 in FIG. 12 indicates the level of a normal operating or work current $I_W$ at a time before shorting (before shorting of the anode to the cathode), and reference numeral 72 indicates the level of current $I_S$ when shorting begins (i.e., while the anode is being shorted to the cathode). Current spikes up dramatically during shorting as illustrated by reference numeral 72. Reference numeral 74 indicates current decline during the shorting, as represented with the capacitance 54 in the equivalent circuit (FIG. 4). After shorting has been completed at time 102, (i.e., after the shorting of the anode to the cathode ceases), current generated by the fuel cell, indicated by reference numeral 76 returns to a work value, for a resumption of normal operation of the fuel cell. The value of current at reference numeral 76 may be at or near the value illustrated by reference numeral 70, or may be different due to benefits of the shunting operation.

Similarly, reference numeral 80 indicates the level of a normal operating or work voltage $V_W$ at a time before shorting (before shorting of the anode to the cathode), and reference numeral 82 indicates the level of voltage at a time during shorting (i.e., while the anode is being shorted to the cathode). Voltage across the fuel cell 18 decays during shorting as illustrated by reference numeral 82. Immediately after shorting, at time 102, voltage spikes. Reference numeral 84 indicates fuel cell voltage immediately after shorting. The difference between the fuel cell voltage 80 before shorting and voltage 86 immediately after shorting is used to determine equivalent series resistance.

FIG. 6 shows shunt control circuitry 22B that is used in place of the shunt control circuitry 22 of FIG. 2, in an alternative embodiment. More particularly, the circuitry 22B of FIG. 6 is well suited for power systems 10 including fuel cells 18 arranged in parallel. The control circuitry 22B includes a switch 36B, that is substantially similar to the switch 36 of FIG. 3, in parallel with the load 66. The switch 36B has open and closed electrical conditions. The controller 30 selectively opens or closes the switch 36B. The control circuitry 22B further includes a switch 37 that is substantially similar to the switch 36 of FIG. 3, in series with the load 66. The switch 36B has open and closed electrical conditions. The controller 30 selectively opens or closes the switch 36B.

Figure 7:
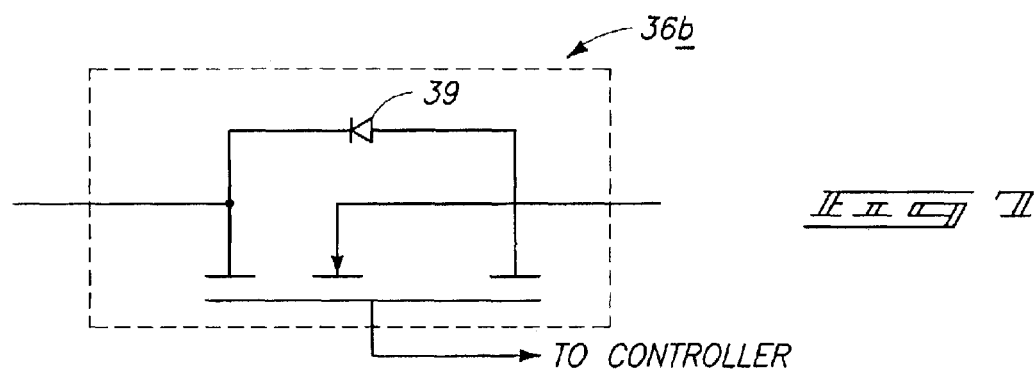
FIG. 7 shows construction details, in one embodiment, of a switch included in the circuitry of FIG. 6.

FIG. 7 shows that each switch 36B, (and 36 and 37), if in the form of a MOSFET, includes an intrinsic diode 39.

Figure 8:
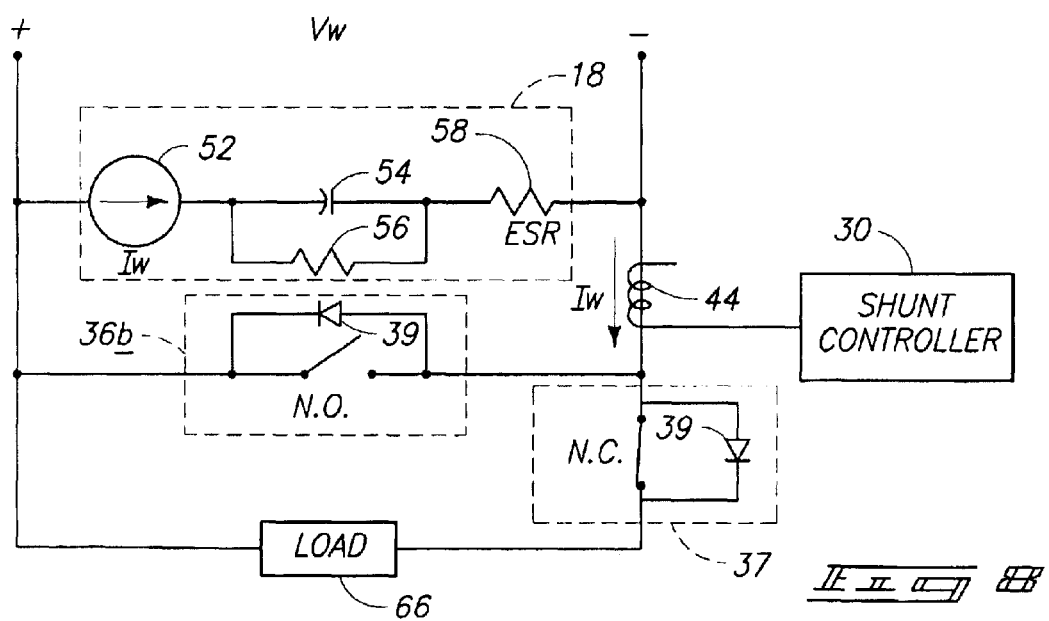
FIG. 8 is an equivalent circuit diagram of the circuitry of FIG. 6.
Figure 9:
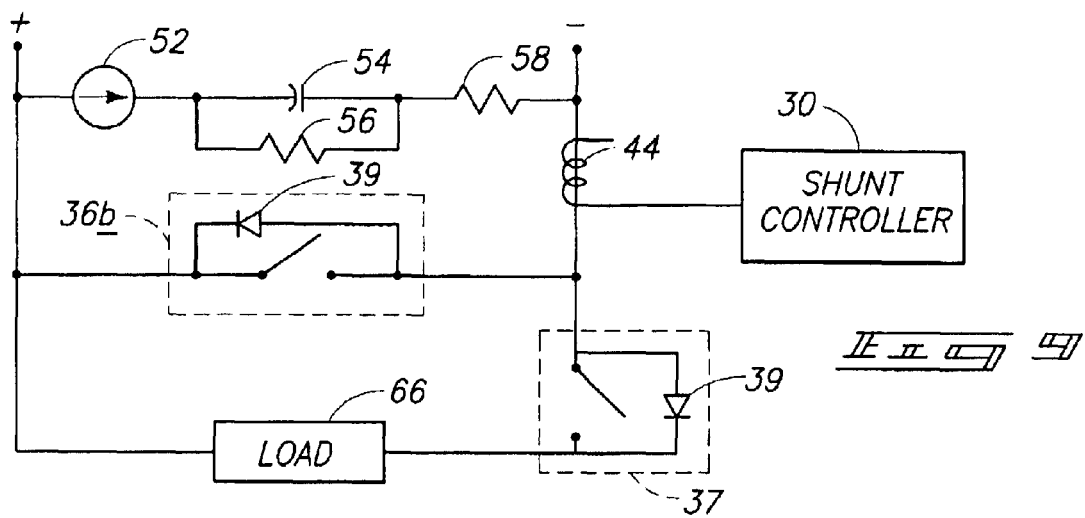
FIG. 9 shows a step, in a sequence of steps, in a shunting operation using the shunt control circuitry of FIG. 6.

FIGS. 8–11 show a sequence of steps involved in a shunting operation using the circuitry of FIG. 9. FIG. 8 is an equivalent circuit diagram of the circuitry of FIG. 6, before shunting. This is shown as time 104 in FIG. 13. The equivalent circuit of the fuel cell is depicted as a current source 52, parallel capacitance 54 and resistor 56, and resistance 58 due to equivalent series resistance, as in FIG. 3. Equivalent series resistance of the switches can be ignored if only voltage across the fuel cell 18 is considered at various times. The switch 37 is normally closed, and the switch 36B is normally open.

FIG. 9 is a simplified or equivalent circuit diagram of the circuitry of FIG. 6, at a time 105 after the time represented by FIG. 8. The normally closed switch 37 is opened by the shunt controller 30. The diode 39 of the switch 37 is forward biased, so current flows. There is a very small change in current (a slight drop in current due to equivalent series resistance of the switch 37).

Figure 10:
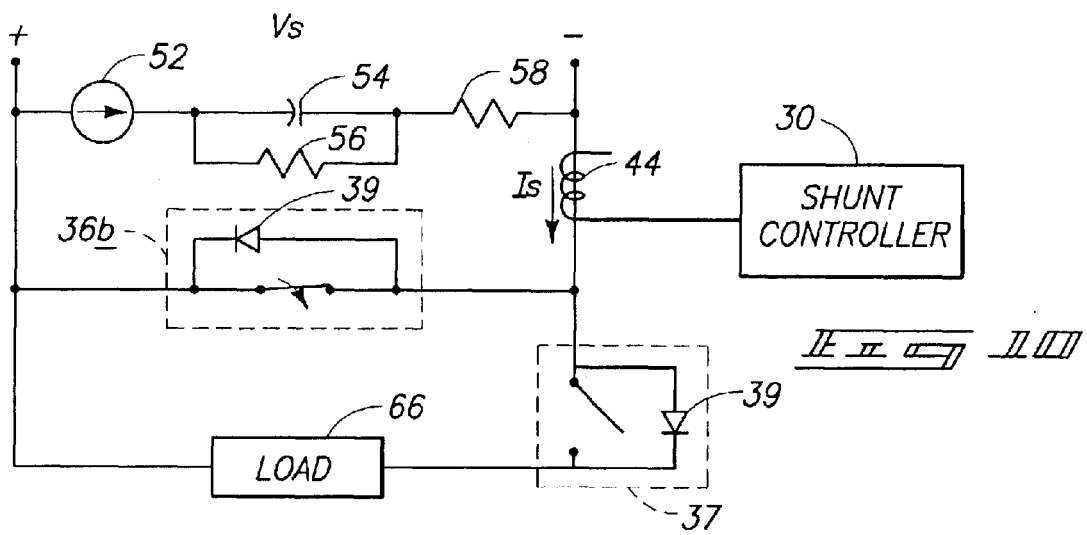
FIG. 10 shows a step, subsequent to the step illustrated in FIG. 9, in the shunting operation.

FIG. 10 is a simplified or equivalent circuit diagram of the circuitry of FIG. 6, at a time 106 after the time represented by FIG. 9. The normally open switch 36B is closed by the shunt controller 30. The diode 39 of the switch 37 is now reverse biased, so there is virtually no current to the load 66, but current flows through the short defined by switch 36B.

Figure 11:
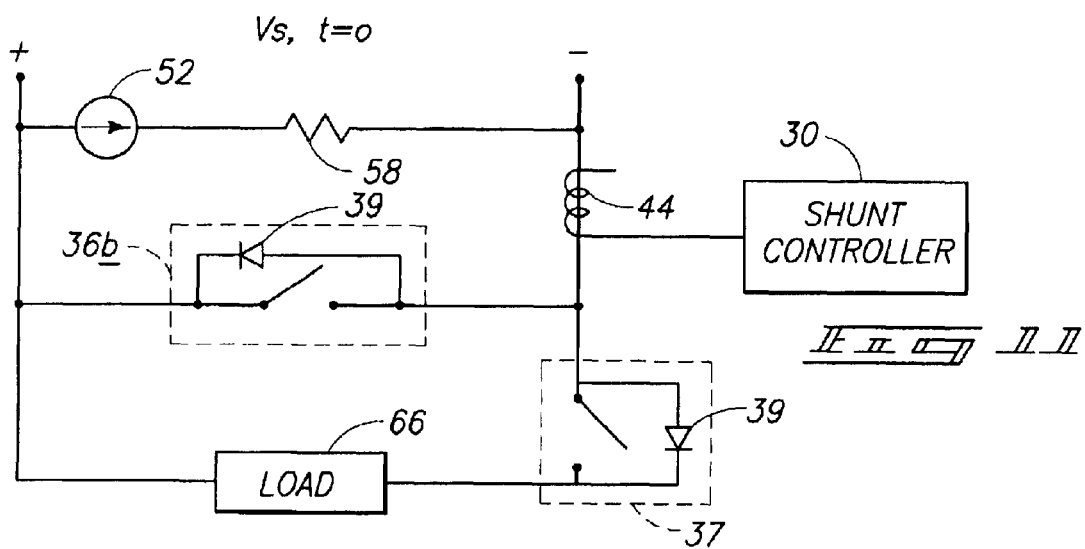
FIG. 11 shows a step, subsequent to the step illustrated in FIG. 10, in the shunting operation.

FIG. 11 is a simplified or equivalent circuit diagram of the circuitry of FIG. 6, at a time 108 (see FIG. 13) after the time represented by FIG. 10. The normally open switch 36B is opened by the shunt controller 30, to remove the short, but the diode 39 of the switch 36B remains reverse biased until the capacitance 54 charges during the period from 108 to 110 shown in FIG. 13. The current $I_S$ is zero. No current flows. At time 110, the switch 37 is closed (same configuration as shown in FIG. 8) until the next shunting operation.

FIG. 13 is a plot showing fuel cell voltage and current versus time before, during, and after shorting that occurs during a shunting operation using the circuitry of FIG. 6. In one embodiment of the invention, equivalent series resistance of the fuel cell 18 is determined by taking the difference $V_{FC}$ between voltage across the fuel cell 18 immediately after the short is removed and voltage $V_S$ during shunting, dividing that difference by current $I_S$ flowing through the fuel cell 18 immediately following the shorting of the output of the fuel cell (i.e., as soon as the short is removed). More particularly, the voltage difference is divided by a current difference (difference between current during and immediately after the shorting), but current immediately after the shorting is zero, so the voltage difference can be divided by $I_S$. Immediately after the short is applied, the hydration level of the fuel cell has not yet changed from the level before the shunting, yet current and voltage change is nearly instantaneous.

More particularly, reference numeral 120 indicates the level of a normal operating or work current $I_W$ at a time before a shorting (before shorting of the anode to the cathode). Reference numeral 122 indicates the level of current $I_s$ during shorting. Current spikes up dramatically during shorting as illustrated. Reference numeral 124 indicates current immediately after shorting. For some time after shorting has been completed, (i.e., for some time after the shorting of the anode to the cathode ceases), current generated by the fuel cell is zero, as indicated by reference number 126. After some time, current returns to a work value, illustrated by reference numeral 128, for a resumption of normal operation of the fuel cell. The value of current at reference numeral 128 may be at or near the value illustrated by reference numeral 128, or may be different, e.g., due to the benefits of shunting.

Similarly, reference numeral 130 indicates the level of a normal operating or work voltage $V_W$ at a time before shorting (before shorting of the anode to the cathode), and reference numeral 132 indicates the level of voltage $V_S$ during shunting (i.e., while the anode is being shorted to the cathode). Immediately after the short is removed, at time 106, voltage spikes. Reference numeral 134 indicates fuel cell voltage $V_{FC}$ immediately after the short is removed. The difference between the fuel cell voltage $V_{FC}$ indicated by reference numeral 134 and the voltage $V_S$ indicated by reference numeral 132 is used to determine equivalent series resistance of the fuel cell Equivalent series resistance is equal to this difference divided by the difference in current between shorting and immediately after shorting. More particularly, equivalent series resistance is equal to the voltage difference divided by shunt current $I_S$ indicated at reference numeral 122. For some time after shorting has been removed, (i.e., for some time after the shorting of the anode to the cathode ceases), voltage across the fuel cell gradually ramps up from the value 134 at time 108, as shown by reference numeral 136. After some time, voltage returns to a work value, illustrated by reference numeral 138, for a resumption of normal operation of the fuel cell. The inventors have discovered that the length of this time, between time 108 and time 110, is related to level of hydration of the fuel cell. The value of voltage at reference numeral 138 may be at or near the value illustrated by reference numeral 130, or may be different, due to benefits of shunting. It is most convenient to measure voltage immediately after shunting, though it can be measured at other times if appropriate calculations are used.

In one embodiment, the length of time between time 108 and time 110 is measured, and level of hydration is determined in response to the length of time between time 108 and time 110. The longer it takes for the fuel cell to recover, the more flooded it was. Thus, one aspect of the invention provides a method comprising measuring an amount of time for current to recover after a short between the anode of a fuel cell and the cathode of the fuel cell is released, and determining level of hydration, prior to the shorting, in response to the length of time.

In one embodiment, different fuel cells of fuel cell power system 10 are shorted at different times so that other fuel cells that are not being shorted can continue to provide power to a load.

The method using the circuitry of FIG. 3 is not as accurate as circuitry described in connection with FIG. 6, because there isn't a sharp knee on the voltage curve in FIG. 12 at time 100. On the other hand, the method using the circuitry of FIG. 3 is simpler than the method described in connection with FIG. 6 and is well suited for embodiments in which fuel cells 18 are arranged in series. The method using the circuitry of FIG. 6 is well suited for embodiments in which fuel cells 18 are arranged in parallel.

Figure 19:
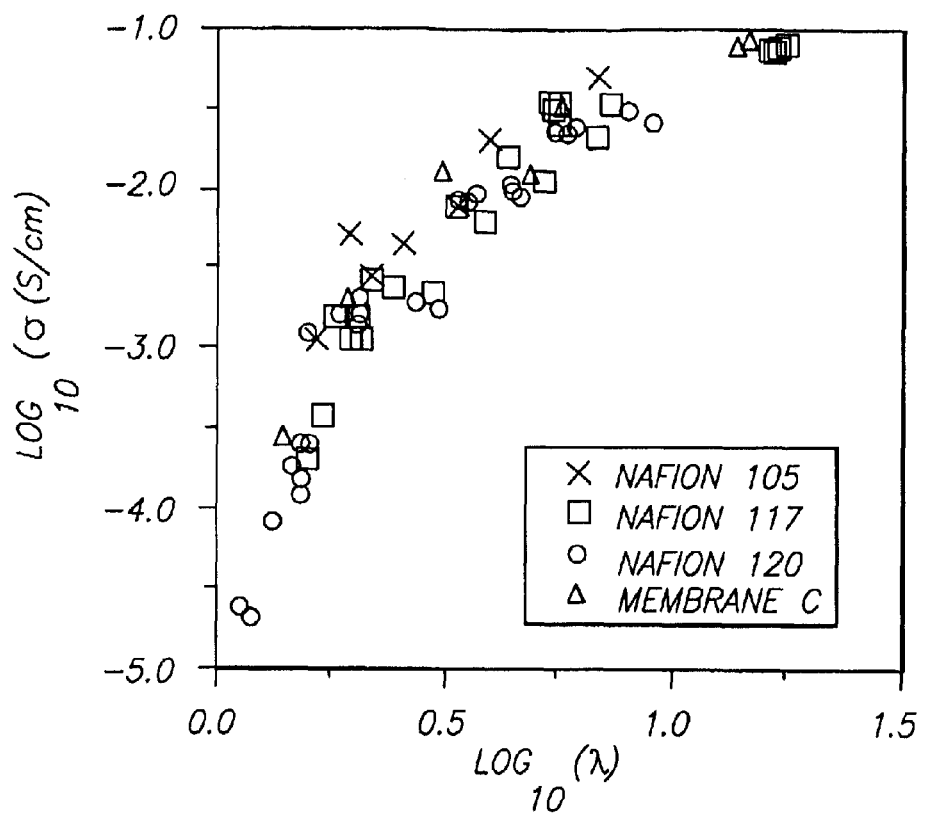
FIG. 19 is a logarithmic plot of electrical conductivity versus water content.
Figure 20:
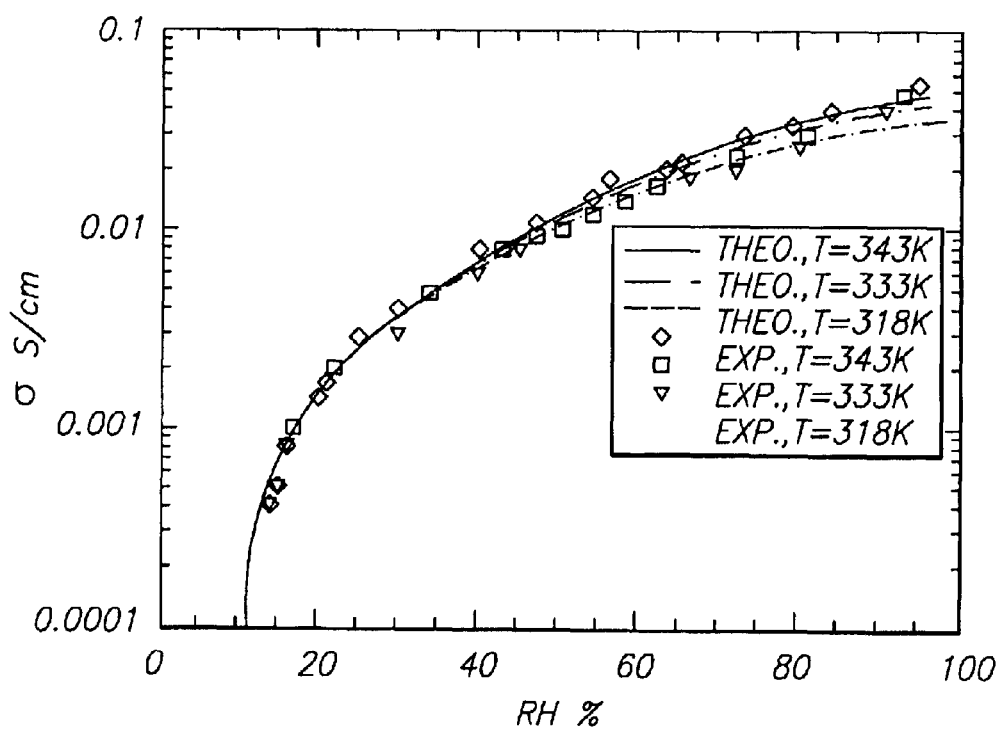
FIG. 20 is a plot of electrical conductivity versus relative humidity.

It is known that there is a relationship between equivalent series resistance of a fuel cell and level of hydration. This is described, for example, in an article by P. D. Beattie et al., titled "Ionic Conductivity of Proton Exchange Membranes," *Journal of Electroanalytical Chemistry*, Volume 503 (2001), pp. 45–56. Also see an article by Mary C. Wintersgill et al., titled "Complex Impedance Measurement on Nafion", *Electrochimica Acta*, Volume 43, Nos. 10–11 (1998), pp. 1533–1538. FIG. 19 is a logarithmic plot of electrical conductivity versus water content described in the article by Mary C. Wintersgill et al. Water content is defined in terms of λ, which is the number of water molecules per sulfonate. Similarly, FIG. 20 is a plot of electrical conductivity versus relative humidity (RH %) described in an article by Tony Thampan et al., titled "Modeling of Conductive Transport in Proton-Exchange Membranes for Fuel Cells", *Journal of The Electrochemical Society*, No. 147(9) (2000), pp. 3242–3250. The authors concluded that the relationship is not linear, and is dependent on the type of PEM used in the fuel cell.

FIG. 17 is a plot of equivalent series resistance versus experiment number showing the relationship of fuel cell equivalent series resistance and fuel cell current output versus experiment number for the particular type of PEM used in the fuel cells 18 of the illustrated embodiment, namely Nafion (TM) membranes by DuPont. Experiments were performed by the inventors using fuel cells of decreasing hydration level, going from left to right, such that experiment number 1 was performed using a flooded fuel cell, experiment number 2 was performed using a less flooded fuel cell, etc., including experiments using normally hydrated and dehydrated fuel cells. Plot 150 represents equivalent series resistance of a fuel cell 18 in milliOhms determined using the method described above in connection with FIG. 3. Plot 152 indicates equivalent series resistance of the same fuel cell 18 and shunt circuitry, including the switch 36, as measured by test equipment (such as, for example, a TEGAM Model 252 impedance meter, measured at 1 kHz), and provides a plot that is substantially parallel to plot 150. In any event the maxima and minima of plot 150 match the maxima and minima of plot 152, which means that an optimization loop routine that attempts to minimize equivalent series resistance, by changing operating parameters of the fuel cell, will be effective. Plot 154 represents current output at 0.6V, of the same fuel cell, in Amps. Plot 155 represents open circuit equivalent series resistance of a fuel cell 18, in milliOhms, and closely tracks plot 150. FIG. 17 indicates that equivalent series resistance of a fuel cell 18 is lowest and current output of the fuel cell is highest when hydration level is normal or optimal. As the fuel cell 18 becomes flooded, relative to normal hydration levels, current output decreases and fuel cell equivalent series resistance increases. Similarly, as the fuel cell 18 becomes dehydrated, relative to normal hydration levels, current output decreases and fuel cell equivalent series resistance increases.

FIG. 18 shows a plot 156 of equivalent series resistance in mOhms for the experiments of FIG. 17 measured in the manner described above, and a plot 158 of equivalent series resistance in mOhms measured by test equipment (e.g., impedance meter). The difference 160 between plots 156 and 158 provides the resistance due to the shunt circuitry including the switch 36 and is substantially linear over the various experiments. Plot 159 is a plot of open circuit equivalent series resistance in mOhms.

FIG. 21 is a flowchart illustrating logic implemented by the controller 30, in one embodiment, for one or more (e.g. all) of the fuel cells 18.

In step 170, fuel cell (or fuel cell and shunt circuitry) equivalent series resistance is determined using one of the methods described above.

In step 172, a parameter is changed by the controller 30, in response to the determined equivalent series resistance. In one embodiment, the parameter changed is short duty cycle. For example, short duration is increased if the equivalent series resistance has increased above predetermined values or by more than predetermined percentage, for example. Alternatively, for the first time through the loop, short duration or frequency is always adjusted (either up or down) regardless of determined equivalent series resistance, so effects of that change in frequency duration can be determined, in an attempt to minimize equivalent series resistance. In one embodiment, duty cycle is changed. More particularly, short duration or frequency is changed in one embodiment.

In one embodiment, shorting normally occurs for, for example, 100 milliseconds every 5 seconds (0.2 Hz). In step 95 (FIG. 14) for example, shorting duration for each shunting operation cycle can be changed, for example, by 100 milliseconds. Other size steps, such as 10, 20, 50, or 100 percent increases in short duration are employed in alternative embodiments. Alternatively, short frequency can be changed, for example, in 2 second steps. Other frequency size steps, such as 1 second steps, 0.5 second steps, 100 millisecond steps or 4 minute steps are employed in alternative embodiments. The size of steps may be selected based on amount of current generated. Longer steps, e.g. 4 minute steps, may be desirable, for example, if a fuel cell is cold, so as to avoid flooding.

In another alternative embodiment, a fuel cell is open circuited for a predetermined amount of time (e.g. disconnected from other fuel cells or from the load) before (e.g., immediately before) a shorting occurrence either always or in response to determined equivalent series resistance. The duration of the open circuiting, in one embodiment, is for anywhere from 0–70 seconds. Open circuiting before shorting can assist in taking measurements of parameters, such as resistance, or current and voltage parameters. Of course, during open circuiting, other fuel cells will have to provide power to the load so the number of available fuel cells and size of load should be considered when setting the length of open circuiting prior to shorting. The modular design of the fuel cell power system 10 allows one fuel cell or cartridge to be open circuited while others continue to supply power.

In step 174, equivalent series resistance is measured again, e.g., after an appropriate delay.

In step 176, a determination is made as to whether or not the determined equivalent series resistance decreased. If so, the change in duty cycle implemented in 174 is maintained or augmented. If not, the change in duty cycle implemented in step 174 is decreased or undone or not continued in the same direction. Other optimization routines known to those of ordinary skill in the art can be employed to continually work towards reducing equivalent series resistance.

In one embodiment, shorting duty cycle is continually adjusted in an attempt to minimize fuel cell equivalent series resistance.

In one embodiment, fuel is shut off before longer shorts (e.g., shorts of 2 to 5 seconds or more). Longer shorts can occur due to the process described above or, in one embodiment, longer shorts normally occur periodically for fuel cells that are being periodically shorted. For example, in one embodiment, fuel is shut off before a short. Then there is a dely of a predetermined amount of time. Then the fuel cell is shorted (e.g. for 100 milliseconds). Shorting can occur again or multiple times before fuel is restored. Then fuel is restored.

FIG. 22 illustrates logic for determining hydration level of a fuel cell 18, in situ. By measuring equivalent series resistance of a fuel cell 18, in step 200, its hydration level is determined in step 202, in one embodiment, using a look up table or other analog or digital circuitry that models the relationship between equivalent series resistance and level of hydration for the particular PEM employed in the fuel cell 18 per the relationships in FIGS. 19 and 20, for example. A signal indicating the determined hydration level, or a visual or audible indication of hydration level (e.g., on a display), is provided in step 204. In one embodiment, duty cycle of shorting is adjusted in response to determined equivalent series resistance to optimize hydration level or output current of the fuel cell. Since the fuel cells of the power system are shorted, from time to time, to increase performance, this provides an opportunity to measure equivalent series resistance, and thus hydration levels of the membrane, in the manner described above.

While the above description has described shorting of fuel cells contained in cartridges, the described procedures can be equally applied to any type of fuel cell. Equivalent series resistance information can be determined, for example, by obtaining information by shorting for a short period of time (e.g., a few milliseconds) in a fuel cell stack arrangement where there is not a plurality of fuel cells which can share a load. Alternatively, in one embodiment, a plurality of fuel cell stacks are employed in place of the cartridges described above. Pulses can be applied to stacks and have the beneficial effects of shorting.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method comprising:

providing a fuel cell having an anode and a cathode and having a level of hydration;

applying a short from the anode to the cathode for a predetermined amount of time;

removing the short;

measuring the amount of time for current to recover after the short between the anode and the cathode of the fuel cell is removed; and determining what the level of hydration of the fuel cell was prior to the shorting, in response to the measured amount of time.

* * * * *

UNITED STATES PATENT AND TRADEMARK OFFICE
CERTIFICATE OF CORRECTION

PATENT NO. : 6,811,906 B2
DATED : November 2, 2004
INVENTOR(S) : Lijun Bai et al.

It is certified that error appears in the above-identified patent and that said Letters Patent is hereby corrected as shown below:

Title page,
Item [56], References Cited, U.S.PATENT DOCUMENTS, please replace "6,160,683 A   12/2000 Boutaghou" with -- 6,160,382 A   12/2000 Yoon -- and replace "6,468,683 B1   10/2002 Menzer et al." with -- 6,468,682 B1   10/2002 Fuglevand et al. --
FOREIGN PATENT DOCUMENTS, please replace "WO 02 37342   4/2002" with -- WO 02 27342   4/2002 --
OTHER PUBLICATIONS, please replace "Wintersgill, Mory C." with -- Wintersgill, Mary C. --

Signed and Sealed this

Tenth Day of May, 2005

JON W. DUDAS
*Director of the United States Patent and Trademark Office*